US011882335B2

(12) United States Patent
Christensen et al.

(10) Patent No.: US 11,882,335 B2
(45) Date of Patent: Jan. 23, 2024

(54) SYSTEMS AND METHODS FOR SCHEDULING INTERACTIVE MEDIA AND EVENTS

(71) Applicant: STRATOSAUDIO, INC., Kirkland, WA (US)

(72) Inventors: Kelly M. Christensen, Kirkland, WA (US); John Phillip Hansen, Austin, TX (US); Thomas Daniel Mock, Sheffield, PA (US)

(73) Assignee: STRATOSAUDIO, INC., Round Rock, TX (US)

( * ) Notice: Subject to any disclaimer, the term of this patent is extended or adjusted under 35 U.S.C. 154(b) by 0 days.

(21) Appl. No.: 17/805,556

(22) Filed: Jun. 6, 2022

(65) Prior Publication Data

US 2023/0127389 A1 Apr. 27, 2023

Related U.S. Application Data

(63) Continuation of application No. 17/202,981, filed on Mar. 16, 2021, now abandoned, which is a
(Continued)

(51) Int. Cl.
*H04N 21/472* (2011.01)
*H04N 21/258* (2011.01)
(Continued)

(52) U.S. Cl.
CPC ... *H04N 21/47214* (2013.01); *H04N 7/17318* (2013.01); *H04N 21/25866* (2013.01);
(Continued)

(58) Field of Classification Search
None
See application file for complete search history.

(56) References Cited

U.S. PATENT DOCUMENTS

| 4,926,255 A | 5/1990 | Von Kohorn |
| 4,975,951 A | 12/1990 | Bennett |

(Continued)

FOREIGN PATENT DOCUMENTS

| CA | 2 316 925 | 7/1999 |
| CA | 2318914 A1 | 7/1999 |

(Continued)

OTHER PUBLICATIONS

U.S. Appl. No. 17/575,085, including its patent prosecution history and the Office Actions therein., filed Jan. 13, 2022, Christensen.
(Continued)

*Primary Examiner* — Fernando Alcon
(74) *Attorney, Agent, or Firm* — KNOBBE, MARTENS, OLSON & BEAR, LLP

(57) ABSTRACT

The user can respond to a media segment wherein the media segment may be associated with a schedulable event. Software on the device can then schedule the event into an electronic calendar system, and/or may use data associated with the media segment. At the appropriate time, the electronic calendar system may notify the user of the scheduled broadcast and/or event.

16 Claims, 4 Drawing Sheets

Related U.S. Application Data continuation of application No. 16/689,725, filed on Nov. 20, 2019, now Pat. No. 10,979,770, which is a continuation of application No. 15/373,987, filed on Dec. 9, 2016, now Pat. No. 10,524,009, which is a continuation of application No. 14/829,042, filed on Aug. 18, 2015, now Pat. No. 9,549,220, which is a continuation of application No. 14/137,698, filed on Dec. 20, 2013, now Pat. No. 9,143,833, which is a continuation of application No. 12/334,400, filed on Dec. 12, 2008, now Pat. No. 8,631,448.

(60) Provisional application No. 61/013,921, filed on Dec. 14, 2007.

(51) Int. Cl.
*H04N 21/81* (2011.01)
*H04N 7/173* (2011.01)
*H04N 21/262* (2011.01)

(52) U.S. Cl.
CPC ..... *H04N 21/25883* (2013.01); *H04N 21/262* (2013.01); *H04N 21/47205* (2013.01); *H04N 21/8166* (2013.01); *H04N 21/8173* (2013.01)

(56) References Cited

U.S. PATENT DOCUMENTS

| | | | |
|---|---|---|---|
| 5,063,610 A | 11/1991 | Alwadish | |
| 5,119,507 A | 6/1992 | Mankovitz | |
| 5,134,719 A | 7/1992 | Mankovitz | |
| 5,303,393 A | 4/1994 | Noreen et al. | |
| 5,438,355 A | 8/1995 | Palmer | |
| 5,444,769 A | 8/1995 | Koen et al. | |
| 5,465,240 A | 11/1995 | Mankovitz | |
| 5,539,635 A | 7/1996 | Larson, Jr. | |
| 5,548,828 A | 8/1996 | Kozaki et al. | |
| 5,549,822 A | 8/1996 | Ferguson | |
| 5,557,541 A | 9/1996 | Schulhof et al. | |
| 5,572,194 A | 11/1996 | Shiota | |
| 5,577,266 A | 11/1996 | Takahisa | |
| 5,579,537 A | 11/1996 | Takahisa | |
| 5,616,876 A | 4/1997 | Cults | |
| 5,661,787 A | 8/1997 | Pocock | |
| 5,703,795 A | 12/1997 | Mankovitz | |
| 5,708,478 A | 1/1998 | Tognazzini | |
| 5,752,159 A | 5/1998 | Faust et al. | |
| 5,761,606 A | 6/1998 | Wolzien | |
| 5,778,181 A | 7/1998 | Hidary | |
| 5,787,090 A | 7/1998 | Van Niekerk et al. | |
| 5,857,156 A | 1/1999 | Anderson | |
| 5,872,589 A | 2/1999 | Morales | |
| 5,898,910 A | 4/1999 | Miyake et al. | |
| 5,903,617 A | 5/1999 | Kamalski | |
| 5,905,865 A | 5/1999 | Palmer et al. | |
| 5,907,793 A | 5/1999 | Reams | |
| 5,948,061 A | 9/1999 | Merriman | |
| 5,963,264 A | 10/1999 | Jackson | |
| 5,991,601 A | 11/1999 | Anderson | |
| 5,991,737 A | 11/1999 | Chen | |
| 6,018,768 A | 1/2000 | Ullman et al. | |
| 6,035,177 A | 3/2000 | Moses et al. | |
| 6,036,086 A | 3/2000 | Sizer, II et al. | |
| 6,067,107 A | 5/2000 | Travaille | |
| 6,098,106 A | 8/2000 | Philyaw et al. | |
| 6,202,210 B1 | 3/2001 | Ludtke | |
| 6,240,555 B1 | 5/2001 | Shoff et al. | |
| 6,286,140 B1 | 9/2001 | Ivanyi | |
| 6,317,784 B1 | 11/2001 | Mackintosh et al. | |
| 6,349,329 B1 | 2/2002 | Mackintosh et al. | |
| 6,374,177 B1 | 4/2002 | Lee et al. | |
| 6,446,262 B1 | 9/2002 | Malaure et al. | |
| 6,463,469 B1 | 10/2002 | Yavitz | |
| 6,473,792 B1 | 10/2002 | Yavitz et al. | |
| 6,493,876 B1 | 12/2002 | DeFreese et al. | |
| 6,493,976 B2 | 12/2002 | Kenney | |
| 6,505,160 B1 | 1/2003 | Levy et al. | |
| 6,507,727 B1 | 1/2003 | Henrick | |
| 6,536,041 B1 | 3/2003 | Knudson et al. | |
| 6,578,047 B1 | 6/2003 | Deguchi | |
| 6,593,876 B2 | 7/2003 | Shuch | |
| 6,611,201 B1 | 8/2003 | Bishop et al. | |
| 6,628,928 B1 | 9/2003 | Crosby et al. | |
| 6,658,232 B1 | 12/2003 | Johnson | |
| 6,701,355 B1 | 3/2004 | Brandt et al. | |
| 6,708,335 B1 | 3/2004 | Ozer et al. | |
| 6,725,022 B1 | 4/2004 | Clayton et al. | |
| 6,728,531 B1 | 4/2004 | Lee et al. | |
| 6,771,317 B2 | 8/2004 | Ellis et al. | |
| 6,792,616 B1 | 9/2004 | Jerding et al. | |
| 6,802,077 B1 | 10/2004 | Schlarb | |
| 6,829,368 B2 | 12/2004 | Meyer et al. | |
| 6,829,486 B2 | 12/2004 | McKenna et al. | |
| 6,888,457 B2 | 5/2005 | Wilkinson et al. | |
| 6,925,489 B1 | 8/2005 | Curtin | |
| 6,928,423 B1 | 8/2005 | Yamanaka | |
| 6,941,154 B1 | 9/2005 | Ritter | |
| 6,957,041 B2 | 10/2005 | Christensen et al. | |
| 6,970,886 B1 | 11/2005 | Conwell et al. | |
| 6,987,734 B2 | 1/2006 | Hundemer | |
| 6,990,312 B1 | 1/2006 | Gioscia et al. | |
| 7,010,263 B1 | 3/2006 | Patsiokas | |
| 7,010,667 B2 | 3/2006 | Vorbach et al. | |
| 7,028,071 B1 | 4/2006 | Slik | |
| 7,054,653 B2 | 5/2006 | Järvi et al. | |
| 7,065,342 B1 | 6/2006 | Rolf | |
| 7,088,950 B2 | 8/2006 | Tassberg et al. | |
| 7,110,714 B1 | 9/2006 | Kay et al. | |
| 7,149,541 B2 | 12/2006 | Rautila | |
| 7,158,753 B2 | 1/2007 | Kagan et al. | |
| 7,159,232 B1 | 1/2007 | Blackketter et al. | |
| 7,190,971 B1 | 3/2007 | Kawamoto | |
| 7,194,235 B2 | 3/2007 | Nykanen et al. | |
| 7,200,611 B2 | 4/2007 | Potrebic et al. | |
| 7,231,175 B2 | 6/2007 | Ellis | |
| 7,249,118 B2 | 7/2007 | Sandler et al. | |
| 7,260,842 B2 | 8/2007 | Hirayama | |
| 7,266,343 B1 | 9/2007 | Yli-Juuti et al. | |
| 7,299,194 B1 | 11/2007 | Manganaris et al. | |
| 7,313,359 B2 | 12/2007 | Steelberg et al. | |
| 7,313,360 B2 | 12/2007 | Steelberg et al. | |
| 7,319,863 B2 | 1/2008 | Engstrom et al. | |
| 7,376,907 B2 | 5/2008 | Santoro et al. | |
| 7,415,430 B2 | 8/2008 | Christensen et al. | |
| 7,415,526 B2 | 8/2008 | Hirayama | |
| 7,458,091 B1 | 11/2008 | Getsin et al. | |
| 7,487,112 B2 | 2/2009 | Barnes, Jr. | |
| 7,489,786 B2 | 2/2009 | Marlowe | |
| 7,500,256 B1 | 3/2009 | Ohmae et al. | |
| 7,533,182 B2 | 5/2009 | Wurtzel et al. | |
| 7,610,597 B1 | 10/2009 | Johnson et al. | |
| 7,647,609 B2 | 1/2010 | Wachtfogel et al. | |
| 7,673,315 B1 | 3/2010 | Wong et al. | |
| 7,746,895 B2 | 6/2010 | Bucher et al. | |
| 7,765,574 B1 | 7/2010 | Maybury et al. | |
| 7,773,939 B2 | 8/2010 | Christensen et al. | |
| 7,788,693 B2 | 8/2010 | Robbins | |
| 7,817,995 B2 | 10/2010 | Khurana et al. | |
| 7,881,657 B2 | 2/2011 | Wang et al. | |
| 7,908,172 B2 | 3/2011 | Corts et al. | |
| 7,908,635 B2 | 3/2011 | Barton et al. | |
| 7,917,130 B1 | 3/2011 | Christensen et al. | |
| 8,000,749 B1 | 8/2011 | McConnell et al. | |
| 8,087,047 B2 | 12/2011 | Olague et al. | |
| 8,121,843 B2 | 2/2012 | Rhoads et al. | |
| 8,115,342 B2 | 4/2012 | Marlowe | |
| 8,166,081 B2 | 4/2012 | Christensen et al. | |
| 8,200,203 B1 | 6/2012 | Christensen et al. | |
| 8,208,014 B2 | 6/2012 | Geiger et al. | |
| 8,351,843 B2 | 1/2013 | Dillon et al. | |
| 8,412,763 B2 | 4/2013 | Jones et al. | |
| 8,458,184 B2 | 6/2013 | Dorogusker et al. | |
| 8,467,724 B2 | 6/2013 | Christensen et al. | |

(56) References Cited

U.S. PATENT DOCUMENTS

| | | |
|---|---|---|
| 8,516,017 B2 | 8/2013 | Christensen et al. |
| 8,589,548 B2 | 11/2013 | Karaoguz et al. |
| 8,631,448 B2 | 1/2014 | Christensen et al. |
| 8,635,302 B2 | 1/2014 | Christensen et al. |
| 8,688,028 B2 | 4/2014 | Christensen et al. |
| 8,875,188 B2 | 10/2014 | Christensen et al. |
| 8,892,458 B2 | 11/2014 | Christensen et al. |
| 8,903,307 B2 | 12/2014 | Christensen et al. |
| 8,938,217 B2 | 1/2015 | Dorogusker et al. |
| 9,143,833 B2 | 9/2015 | Christensen et al. |
| 9,148,292 B2 | 9/2015 | Christensen et al. |
| 9,294,806 B2 | 3/2016 | Christensen et al. |
| 9,325,440 B2 | 4/2016 | Christensen et al. |
| 9,355,405 B2 | 5/2016 | Christensen et al. |
| 9,366,405 B2 | 6/2016 | Barta et al. |
| 9,549,220 B2 | 1/2017 | Christensen et al. |
| 9,584,843 B2 | 2/2017 | Christensen et al. |
| 9,800,426 B2 | 10/2017 | Christensen et al. |
| 9,953,344 B2 | 4/2018 | Christensen et al. |
| 9,998,245 B2 | 6/2018 | Christensen et al. |
| 10,062,095 B2 | 8/2018 | Poltorak |
| 10,148,376 B1 | 12/2018 | Christensen et al. |
| 10,303,434 B2 | 5/2019 | Finley et al. |
| 10,423,981 B2 | 9/2019 | Christensen et al. |
| 10,439,837 B2 | 10/2019 | Christensen et al. |
| 10,469,888 B2 | 11/2019 | Christensen et al. |
| 10,491,680 B2 | 11/2019 | Christensen et al. |
| 10,498,472 B2 | 12/2019 | Christensen et al. |
| 10,524,009 B2 | 12/2019 | Christensen et al. |
| 10,819,298 B2 | 10/2020 | Corts et al. |
| 10,979,770 B2 | 4/2021 | Christensen et al. |
| 9,294,806 C1 | 10/2022 | Christensen et al. |
| 2001/0001160 A1 | 5/2001 | Shoff et al. |
| 2001/0005854 A1 | 6/2001 | Murata et al. |
| 2001/0031013 A1 | 10/2001 | Stetzler et al. |
| 2002/0023010 A1 | 2/2002 | Rittmaster et al. |
| 2002/0026474 A1 | 2/2002 | Wang et al. |
| 2002/0038455 A1* | 3/2002 | Srinivasan ....... H04N 21/26233 |
| | | 725/35 |
| 2002/0004608 A1 | 4/2002 | Steele et al. |
| 2002/0046084 A1 | 4/2002 | Steele et al. |
| 2002/0046407 A1 | 4/2002 | Franco |
| 2002/0072326 A1 | 6/2002 | Qureshey et al. |
| 2002/0095228 A1 | 7/2002 | Corts et al. |
| 2002/0133824 A1 | 9/2002 | Mensch |
| 2002/0162118 A1 | 10/2002 | Levy et al. |
| 2002/0178441 A1 | 11/2002 | Hashimoto |
| 2002/0199193 A1 | 12/2002 | Gogoi et al. |
| 2003/0014755 A1 | 1/2003 | Williams |
| 2003/0051252 A1 | 3/2003 | Miyaoku et al. |
| 2003/0077065 A1 | 4/2003 | Scholten et al. |
| 2003/0086694 A1 | 5/2003 | Davidsson |
| 2003/0097338 A1 | 5/2003 | Mankovich et al. |
| 2003/0105809 A1 | 6/2003 | Yoshii et al. |
| 2003/0153288 A1 | 8/2003 | Nakatsuyama |
| 2003/0174861 A1 | 9/2003 | Levy et al. |
| 2003/0182052 A1 | 9/2003 | DeLorme et al. |
| 2003/0200543 A1 | 10/2003 | Burns |
| 2003/0208756 A1 | 11/2003 | Macrae et al. |
| 2003/0212708 A1 | 11/2003 | Potrebic et al. |
| 2003/0220835 A1 | 11/2003 | Barnes |
| 2003/0229900 A1 | 12/2003 | Reisman |
| 2004/0015704 A1 | 1/2004 | De Schrijver |
| 2004/0198279 A1 | 10/2004 | Anttila et al. |
| 2004/0205810 A1 | 10/2004 | Matheny et al. |
| 2004/0260682 A1 | 12/2004 | Herley et al. |
| 2004/0266336 A1 | 12/2004 | Patsiokas et al. |
| 2004/0268403 A1 | 12/2004 | Krieger et al. |
| 2004/0268407 A1 | 12/2004 | Sparrell et al. |
| 2005/0020223 A1 | 1/2005 | Ellis et al. |
| 2005/0021744 A1 | 1/2005 | Haitsuka |
| 2005/0071223 A1 | 3/2005 | Jain et al. |
| 2005/0114529 A1 | 5/2005 | Lambert |
| 2005/0166248 A1 | 7/2005 | Blackketter et al. |
| 2005/0227611 A1 | 10/2005 | Ellis |
| 2005/0262542 A1 | 11/2005 | DeWeese et al. |
| 2006/0075426 A1 | 4/2006 | Koch et al. |
| 2006/0101081 A1 | 5/2006 | Lin et al. |
| 2006/0117040 A1 | 6/2006 | Begeja et al. |
| 2006/0141962 A1 | 6/2006 | Forbes et al. |
| 2006/0174261 A1 | 8/2006 | Cline, Jr. et al. |
| 2006/0184960 A1 | 8/2006 | Horton et al. |
| 2006/0206582 A1 | 9/2006 | Finn |
| 2006/0212921 A1 | 9/2006 | Carr |
| 2006/0218029 A1 | 9/2006 | Chin |
| 2007/0022437 A1 | 1/2007 | Gerken |
| 2007/0028176 A1 | 2/2007 | Perdomo et al. |
| 2007/0088852 A1 | 4/2007 | Levkovitz |
| 2007/0107010 A1 | 5/2007 | Jolina et al. |
| 2007/0143777 A1 | 6/2007 | Wang |
| 2007/0156457 A1 | 7/2007 | Brown |
| 2007/0157257 A1 | 7/2007 | Kagan et al. |
| 2007/0174471 A1 | 7/2007 | Van Rossum |
| 2007/0198353 A1 | 8/2007 | Behringer et al. |
| 2007/0226146 A1 | 9/2007 | Ruul |
| 2007/0250194 A1 | 10/2007 | Rhoads et al. |
| 2007/0261074 A1 | 11/2007 | Yun |
| 2007/0287456 A1 | 12/2007 | Shimizu |
| 2008/0003961 A1 | 1/2008 | Acuna et al. |
| 2008/0049704 A1 | 2/2008 | Witteman et al. |
| 2008/0065507 A1 | 3/2008 | Morrison et al. |
| 2008/0086754 A1 | 4/2008 | Chen et al. |
| 2008/0114664 A1 | 5/2008 | Harb |
| 2008/0148320 A1 | 6/2008 | Howcroft |
| 2008/0152039 A1 | 6/2008 | Shah et al. |
| 2008/0155607 A1 | 6/2008 | Klappert |
| 2008/0183757 A1 | 7/2008 | Dorogusker et al. |
| 2008/0188209 A1 | 8/2008 | Dorogusker et al. |
| 2008/0231228 A1 | 9/2008 | Fowler et al. |
| 2008/0235746 A1 | 9/2008 | Peters et al. |
| 2008/0244640 A1 | 10/2008 | Belleguie |
| 2008/0263673 A1 | 10/2008 | Brun et al. |
| 2009/0030537 A1 | 1/2009 | Hartle |
| 2009/0061763 A1 | 3/2009 | Dillon et al. |
| 2009/0104870 A1 | 4/2009 | Christensen et al. |
| 2009/0104872 A1 | 4/2009 | Christensen et al. |
| 2009/0150925 A1 | 6/2009 | Henderson |
| 2009/0177736 A1 | 7/2009 | Christensen et al. |
| 2009/0192916 A1 | 7/2009 | Casper |
| 2011/0179453 A1 | 7/2011 | Poniatowski |
| 2014/0020036 A1 | 1/2014 | Hasek |
| 2016/0100018 A1 | 4/2016 | Mackenzie et al. |
| 2017/0099300 A1 | 4/2017 | Rittmaster et al. |
| 2017/0155948 A1* | 6/2017 | Harper ................. H04N 21/435 |
| 2017/0155963 A1* | 6/2017 | Harper ............. H04N 21/47214 |
| 2020/0137442 A1 | 4/2020 | Christensen |
| 2022/0038786 A1 | 2/2022 | Christensen |
| 2022/0321935 A1* | 10/2022 | Aher ................ H04N 21/26258 |

FOREIGN PATENT DOCUMENTS

| | | |
|---|---|---|
| DE | 44 27 046 A1 | 2/1996 |
| DE | 196 27 308 A1 | 1/1998 |
| EP | 0 713 335 A2 | 5/1996 |
| EP | 1137210 A2 | 9/2001 |
| EP | 0647377 B2 | 4/2005 |
| EP | 1 742 397 A2 | 1/2007 |
| GB | 2346472 | 8/2000 |
| HK | 1150692 | 1/2012 |
| JP | 07-500715 | 1/1995 |
| JP | 08-139624 | 5/1996 |
| JP | 09-162818 | 6/1997 |
| JP | 09-163346 | 6/1997 |
| JP | 10-135855 | 5/1998 |
| JP | 10-163988 | 6/1998 |
| JP | 10-177532 | 6/1998 |
| JP | 10-257401 | 9/1998 |
| JP | 10-257455 | 9/1998 |
| JP | 2000-115093 | 4/2000 |
| JP | 2000-115094 | 4/2000 |
| JP | 2000-183835 | 6/2000 |
| JP | 2000-196547 | 7/2000 |
| JP | 2000-236306 | 8/2000 |
| JP | 2000292182 A | 10/2000 |

(56) References Cited

FOREIGN PATENT DOCUMENTS

| | | |
|---|---|---|
| JP | 2002-504775 | 2/2002 |
| JP | 2005-130132 | 5/2005 |
| JP | 2005-151338 | 6/2005 |
| JP | 2006-20286 | 1/2006 |
| JP | 2006-185441 | 7/2006 |
| JP | 2006-340021 | 12/2006 |
| KR | 10-1996-0033096 | 9/1996 |
| KR | 10-1998-0078248 | 11/1998 |
| WO | WO 1990/000847 | 1/1990 |
| WO | WO 1992/014222 | 8/1992 |
| WO | WO 1994/002909 | 2/1994 |
| WO | WO 1997/021291 | 6/1997 |
| WO | WO 1997/042724 | 11/1997 |
| WO | WO 1997/045814 | 12/1997 |
| WO | WO 1999/018518 | 4/1999 |
| WO | WO 1999/035771 | 7/1999 |
| WO | WO 1999/035809 | 7/1999 |
| WO | WO 1999/043109 | 8/1999 |
| WO | WO 00/04706 | 1/2000 |
| WO | WO 00/22758 | 4/2000 |
| WO | WO 2000/019662 | 4/2000 |
| WO | WO 2000/078050 | 12/2000 |
| WO | WO 2001/001331 | 1/2001 |
| WO | WO 2001/022633 | 3/2001 |
| WO | WO 01/24070 | 4/2001 |
| WO | WO 2001/052541 | 7/2001 |
| WO | WO 2001/057759 | 8/2001 |
| WO | WO 0161997 A1 | 8/2001 |
| WO | WO 2001/077779 | 10/2001 |
| WO | WO 02/067447 | 8/2002 |
| WO | WO 02/087120 | 10/2002 |
| WO | WO 06/075313 | 7/2006 |
| WO | WO 2006/122028 | 11/2006 |
| WO | WO 2008/002000 | 1/2008 |

OTHER PUBLICATIONS

U.S. Appl. No. 17/575,232, including its patent prosecution history and the Office Actions therein., filed Jan. 13, 2022, Christensen.
U.S. Appl. No. 17/575,474, including its patent prosecution history and the Office Actions therein., filed Jan. 13, 2022, Christensen.
U.S. Appl. No. 90/019,055 Reexamination of U.S. Pat. No. 9,294,806 including its patent prosecution history, the cited references, and the Office Actions therein., filed Jan. 13, 2022, Christensen et al.
U.S. Appl. No. 90/019,056 Reexamination of U.S. Pat. No. 9,584,843 including its patent prosecution history, the cited references, and the Office Actions therein., filed Jan. 13, 2022, Christensen et al.
U.S. Appl. No. 90/019,103, Reexamination of U.S. Pat. No. 9,294,806 including its patent prosecution history, the cited references, and the Office Actions therein., filed Jul. 29, 2022, Christensen et al.
U.S. Appl. No. 90/019,102, Reexamination of U.S. Pat. No. 9,584,843 including its patent prosecution history, the cited references, and the Office Actions therein., filed Jul. 29, 2022, Christensen et al.
U.S. Appl. No. 18/065,104, including its patent prosecution history and the Office Actions therein., filed Dec. 13, 2022, Christensen et al.
"Bookmark Your World", 1999-2000 Xenote, www.xenote.com.
"Sirius to Add 'Instant Buy' Button", Mar. 13, 2000, Twice, V 15, n 7, p. 28.
Jan. 25, 2000, Showcase 2000—Xenote Press Release re Xenote iTage, www.xenote.com/html/press/releases.html.
Petition for Inter Partes Review of U.S. Pat. No. 8,903,307, Case No. IPR2021-00712, Apr. 16, 2021.
Amazon.com, Amazon Standard Identification Number, https://en.wikipedia.org/wiki/Amazon_Standard_Identification_Number, Jan. 29, 2005, available at https://web.archive.org/web/20050129220323/https://en.wikipedia.org/wiki/Amazon_Standard_Identification_Number (IPR2021-00712, Ex. 1011).
Cora L. Diaz Chumaceiro, Induced Recall of Mozart's Requiem in Amadeus, 60 Am. J. of Psychoanalysis 85, Mar. 1, 2000(IPR2021-00712, Ex. 1010).
Amazon.com, What are ASINs, ISBNs, and UPCs?, https://www.amazon.com/gp/seller/asin-upc-isbn-info.html, Feb. 27, 2007, available at https://web.archive.org/web/20070227180429/https://www.amazon.com/gp/seller/asin-upc-isbn-info.html (IPR2021-00712, Ex. 1009).
R. Smith, IP Address: Your Internet Identity, Mar. 29, 1997 (IPR2021-00712, Ex. 1007).
Declaration of Vijay Madisetti, PhD in Support of Petition for Inter Partes Review of U.S. Pat. No. 8,903,307, Executed Apr. 13, 2021 (IPR2021-00712, Ex. 1003).
Petition for Inter Partes Review of U.S. Pat. No. 8,688,028, Case No. IPR2021-00716, Apr. 16, 2021.
Declaration of Vijay Madisetti, PhD in Support of Petition for Inter Partes Review of U.S. Pat. No. 8,688,028, Executed Apr. 13, 2021 (IPR2021-00716, Ex. 1003).
Petition for Inter Partes Review of U.S. Pat. No. 8,200,203, Case No. IPR2021-00717, Apr. 16, 2021.
Declaration of Vijay Madisetti, PhD in Support of Petition for Inter Partes Review of U.S. Pat. No. 8,200,203, Executed Apr. 13, 2021(IPR2021-00717, Ex. 1003).
Playlist Courtesy of the Dr. Demento Show, the Dr. Demento Show #02-52—Dec. 29, 2002, available at dmdb.org/cgi-bin/plinfo.pl?funny25.02.html (IPR2021-00717, Ex. 1007).
Petition for Inter Partes Review of U.S. Pat. No. 9,584,843, Case No. IPR2021-00718, Apr. 16, 2021.
PostgreSQL 8.2.22 Documentation, the PostgreSQL Global Development Group, Copyright 1996-2006, pp. xliv-xlvii and 225 (IPR2021-00718, Ex. 1007).
Declaration of Vijay Madisetti, PhD in Support of Petition for Inter Partes Review of U.S. Pat. No. 9,584,843, Executed Apr. 13, 2021 (IPR2021-00718, Ex. 1003).
Petition for Inter Partes Review of U.S. Pat. No. 9,294,806, Case No. IPR2021-00719, Apr. 16, 2021.
National Radio Systems Committee, NRSC-R300 Program Associated Data (PAD) Field Length Study, Nov. 2011, (IPR2021-00719, Ex. 1008).
HD Radio™ Air Interface Design Description Program Service Data, Rev. D, Nov. 7, 2007 (IPR2021-00719, Ex. 1007).
Declaration of Vijay Madisetti, PhD in Support of Petition for Inter Partes Review of U.S. Pat. No. 9,294,806, Executed Apr. 13, 2021 (IPR2021-00719, Ex. 1003).
Petition for Inter Partes Review of U.S. Pat. No. 9,355,405, Case No. IPR2021-00720, Apr. 16, 2021.
National Radio Systems Committee, United States RBDS Standard, pp. 2, 6, 25, 41, 47, 51, 56, and 57, Apr. 9, 1998 (IPR2021-00720, Ex. 1006).
Declaration of Tim A. Williams, PhD in Support of Petition for Inter Partes Review of U.S. Pat. No. 9,355,405, Executed Apr. 13, 2021 (IPR2021-00720, Ex. 1003).
Petition for Inter Partes Review of U.S. Pat. No. 8,166,081, Case No. IPR2021-00721, Apr. 16, 2021.
Declaration of Tim A. Williams, PhD in Support of Petition for Inter Partes Review of U.S. Pat. No. 8,166,081, Executed Apr. 13, 2021 (IPR2021-00721, Ex. 1003).
W. Richard Stevens, TCP/IP Illustrated, vol. 1, pp. 9, 34, and 226, Copyright 1994 (IPR2021-00721, Ex. 1007).
Data-Over-Cable Service Interface Specifications, DOCSIS 1.1 Radio Frequency Interface Specification, pp. ii and 47, Sep. 7, 2005 (IPR2021-00721, Ex. 1008).
Infringement Claim Chart for U.S. Pat. No. 8,688,028, Exhibit 1 of Infringement Contentions in *StratosAudio, Inc.* v. *Volvo Cars of North America, LLC* et al., WDTX Case No. 6-20-cv-01129.
Infringement Claim Chart for U.S. Pat. No. 8,903,307, Exhibit 2 of Infringement Contentions in *StratosAudio, Inc.* v. *Volvo Cars of North America, LLC* et al., WDTX Case No. 6-20-cv-01129.
Infringement Claim Chart for U.S. Pat. No. 9,584,843, Exhibit 3 of Infringement Contentions in *StratosAudio, Inc.* v. *Volvo Cars of North America, LLC* et al., WDTX Case No. 6-20-cv-01129.
Infringement Claim Chart for U.S. Pat. No. 9,294,806, Exhibit 4 of Infringement Contentions in *StratosAudio, Inc.* v. *Volvo Cars of North America, LLC* et al., WDTX Case No. 6-20-cv-01129.

(56) References Cited

OTHER PUBLICATIONS

Infringement Claim Chart for U.S. Pat. No. 8,200,203, Exhibit 5 of Infringement Contentions in *StratosAudio, Inc.* v. *Volvo Cars of North America, LLC* et al., WDTX Case No. 6-20-cv-01129.
Infringement Claim Chart for U.S. Pat. No. 9,355,405, Exhibit 6 of Infringement Contentions in *StratosAudio, Inc.* v. *Volvo Cars of North America, LLC* et al., WDTX Case No. 6-20-cv-01129.
Infringement Claim Chart for U.S. Pat. No. 8,166,081, Exhibit 7 of Infringement Contentions in *StratosAudio, Inc.* v. *Volvo Cars of North America, LLC* et al., WDTX Case No. 6-20-cv-01129.
Infringement Claim Chart for U.S. Pat. No. 9,143,833, Exhibit 8 of Infringement Contentions in *StratosAudio, Inc.* v. *Volvo Cars of North America, LLC* et al., WDTX Case No. 6-20-cv-01129.
Defendants' Disclosure of Invalidity Contentions with Exhibits in *StratosAudio, Inc.* v. *Hyundai Motor America*, WDTX Case No. 6-20-cv-01125-ADA.
Letter from Rowland to Songer re Inter Partes Review of U.S. Pat. No. 8,903,307 Case No. 6:20-cv-01125-ADA, dated Jul. 23, 2021.
Petition for Inter Partes Review of U.S. Pat. No. 8,688,028, in *StratosAudio, Inc.* v. *Hyundai Motor America*, Case No. IPR2021-01303, Jul. 22, 2021.
Petition for Inter Partes Review of U.S. Pat. No. 8,903,307, in *StratosAudio, Inc.* v. *Hyundai Motor America*, Case No. IPR2021-01305, Jul. 23, 2021.
Petition for Inter Partes Review of U.S. Pat. No. 8,166,081, in *StratosAudio, Inc.* v. *Hyundai Motor America*, Case No. IPR2021-01267, Jul. 16, 2021.
Petition for Inter Partes Review of U.S. Pat. No. 8,200,203, in *StratosAudio, Inc.* v. *Hyundai Motor America*, Case No. IPR2021-01371, Aug. 9, 2021.
Declaration of Dr. Kevin C. Almeroth in Support of Petition for Inter Partes Review of U.S. Pat. No. 8,166,081, executed Jul. 15, 2021, (IPR2021-01267, Ex-1002).
Plaintiff's Preliminary Infringement Contentions, dated May 13, 2021, including Claim Chart for U.S. Pat. No. 8,166,081 (IPR2021-01267, Ex-1020).
Declaration of Dr. Kevin C. Almeroth in Support of Petition for Inter Partes Review of U.S. Pat. No. 8,688,028, executed Jul. 22, 2021, (IPR2021-01303, Ex-1002).
Plaintiff's Preliminary Infringement Contentions, dated May 13, 2021, including Claim Chart for U.S. Pat. No. 8,688,028, (IPR2021-01303, Ex-1020).
Declaration of Dr. Kevin C. Almeroth in Support of Petition for Inter Partes Review of U.S. Pat. No. 8,200,203, executed Aug. 8, 2021, (IPR2021-01371, Ex-1002).
Plaintiff's Preliminary Infringement Contentions, dated May 13, 2021, including Claim Chart for U.S. Pat. No. 8,200,203, (IPR2021-01371, Ex-1020).
Petitioner's Stipulation Letter to Patent Owner, in Review of U.S. Pat. No. 8,200,203 *Hyundai Motor America* v. *StratosAudio, Inc.* Case No. IPR2021-01371, Ex-1021, dated Aug. 9, 2021.
Petitioner's Stipulation Letter to Patent Owner, in Review of U.S. Pat. No. 8,688,028 *Hyundai Motor America* v. *StratosAudio, Inc.* Case No. IPR2021-01303, Ex-1021, dated Jul. 22, 2021.
Petitioner's Stipulation Letter to Patent Owner, in Review of U.S. Pat. No. 8,166,081 *Hyundai Motor America* v. *StratosAudio, Inc.* Case No. IPR2021-01267, Ex-1021, dated Jul. 16, 2021.
"WDTX Now Has 25% of All US Patent Cases" by Ryan Davis, Law360 Article in Review of U.S. Pat. No. 8,200,203 *Hyundai Motor America* v. *StratosAudio, Inc.* Case No. IPR2021-01371, Ex-1025, dated Aug. 9, 2021.
Motion for Joinder to Inter Partes Review of U.S. Pat. No. 8,688,028, Case No. IPR2022-00204, Nov. 22, 2021.
Petition for Inter Partes Review of U.S. Pat. No. 8,688,028, Case No. IPR2022-00204, Nov. 22, 2021.
Motion for Joinder to Inter Partes Review of U.S. Pat. No. 8,903,307, Case No. IPR2022-00205, Nov. 22, 2021.
Petition for Inter Partes Review of U.S. Pat. No. 8,903,307, Case No. IPR2022-00205, Nov. 22, 2021.
Motion for Joinder to Inter Partes Review of U.S. Pat. No. 8,166,081, Case No. IPR2022-00203, Nov. 22, 2021.
Petition for Inter Partes Review of U.S. Pat. No. 8,166,081 Case No. IPR2022-00203, Nov. 22, 2021.
Motion for Joinder to Inter Partes Review of U.S. Pat. No. 9,355,405, Case No. IPR2022-00224, Nov. 19, 2021.
Petition for Inter Partes Review of U.S. Pat. No. 9,355,405 Case No. Case No. IPR2022-00224, Nov. 19, 2021.
Defendants' Disclosure of Final Invalidity Contentions with Exhibits, dated Jan. 28, 2022, in *StratosAudio, Inc.* v. *Hyundai Motor America*, WDTX Case No. 6:20-cv-01125-ADA, in 5102 pages.
Request for Ex Parte Reexamination and Exhibits filed Jan. 31, 2022, in U.S. Pat. No. 9,294,806 in 883 pages.
Request for Ex Parte Reexamination and Exhibits filed Jan. 31, 2022, in U.S. Pat. No. 9,584,843 in 672 pages.
2008 Ford Lincoln MKX Sync Quick Reference Guide (Aug. 16, 2007).
Harman Consumer Group, Inc., JBL on Time 400IHD User Guide, Copyright 2008, in 23 pages.
Nokia Corporation, Nokia N91 User Guide, Copyright 2006, in 257 pages.
Polk Audio, Inc., I-Sonic Entertainment System 2 Owner's Guide, Copyright 2007, in 34 pages.
Vodafone, Vodafone 905SH User's Manual, Dated 2006, in 450 pages.
Sony Ericsson Mobile Communication AB, Sony Ericsson W950i User Guide, Copyright 2006, in 98 pages.
Decision Denying Institution of Inter Partes Review of U.S. Pat. No. 9,584,843, Case No. IPR2021-00718, Oct. 25, 2021.
Petitioner's Request for Rehearing, U.S. Pat. No. 9,584,843, Case No. IPR2021-00718, Nov. 4, 2021.
Petitioner's Request for Rehearing, U.S. Pat. No. 9,294,806, Case No. IPR2021-00719, Nov. 4, 2021.
Decision Denying Institution of Inter Partes Review of U.S. Pat. No. 9,294,806 Case No. IPR2021-00719, Oct. 22, 2021.
Patent Owner Response, U.S. Pat. No. 8,166,081, Case No. IPR2021-01267, Apr. 19, 2022.
Patent Owner Response, U.S. Pat. No. 8,903,307, Case No. IPR2021-01305, Apr. 19, 2022.
Claim Construction Order in *StratosAudio, Inc.* v. *Hyundai Motor America*, WDTX Case No. 6:20-cv-01125-ADA, Dated Dec. 15, 2021.
Request for Ex Parte Reexamination and Exhibits filed Jul. 29, 2022, in U.S. Pat. No. 9,294,806 in 3410 pages.
Request for Ex Parte Reexamination and Exhibits filed Jul. 29, 2022, in U.S. Pat. No. 9,584,843 in 1628 pages.
Complaint for Patent Infringement, Case No. 6:20-cv-1131 (WDTX), Transferred to Case No. 2:22-cv-10524 (EDMI), Dated Dec. 11, 2020 (Ex. NPL2 of U.S. Pat. No. 9,294,806 Reexamantion Request filed Jul. 29, 2022).
IEEE 100 the Authoritative Dictionary of IFEE Standards Terms 7th Ed. re Definition for "Database" (Ex. NPL3 of U.S. Pat. No. 9,294,806 Reexamantion Request filed Jul. 29, 2022).
Technical Advances in Digital Audio Radio Broadcasting, Proceedings of the IEEE, vol. 90, No. 8, Aug. 2002, Faller (Ex. NPL4 of U.S. Pat. No. 9,294,806 Reexamantion Request filed Jul. 29, 2022).
IBiquity, HD RadioTM Air Interface Design Description—Station Information Service Transport, Rev. E (Feb. 18, 2005) (Ex. NPL5 of U.S. Pat. No. 9,294,806 Reexamantion Request filed Jul. 29, 2022).
The Future of AM and FM radio: Answering questions about HD Radio technology, Audio/Video International, Jan. 2005 Issue, Gardner (Ex. NPL6 of U.S. Pat. No. 9,294,806 Reexamantion Request filed Jul. 29, 2022).
IBiquity.com, How It Works, (Jan. 25, 2007), available at https://web.archive.org/web/20070125071721/http:/www.ibiquity.com/hd_radio/hdradio_how_does_it_work (Ex. NPL7 of U.S. Pat. No. 9,294,806 Reexamantion Request filed Jul. 29, 2022).
hdradio.com, Polk Audio Introduces I-Sonic® Entertainment System 2, (Oct. 17, 2007), available at https://web.archive.org/web/20071017140634/http:/hdradio.com/press_room.php?newscontent=222 (Ex. NPL8 of U.S. Pat. No. 9,294,806 Reexamantion Request filed Jul. 29, 2022).

(56) References Cited

OTHER PUBLICATIONS hdradio.com, FCC Approval Process, 2022, available at https://hdradio.com/broadcasters/us-regulatory/fcc-approval-process/ (Ex. NPL9 of U.S. Pat. No. 9,294,806 Reexamantion Request filed Jul. 29, 2022).

iBiquity.com, HD Radio Mobile Data Services, (Jan. 25, 2007), available at https://web.archive.org/web/20070125072233/http://www.ibiquity.com/automotive/new_mobile_service_providers (Ex. NPL10 of U.S. Pat. No. 9,294,806 Reexamantion Request filed Jul. 29, 2022).

Crisco, John, Polk Audio Introduces I-Sonic® Entertainment System 2 (Sep. 6, 2007), available at https://web.archive.org/web/20070910201140/http:/isonic.polkaudio.com/learn/isonic2-press-release.php (Ex. NPL11 of U.S. Pat. No. 9,294,806 Reexamantion Request filed Jul. 29, 2022).

Covert, Adrian, Apple to Work With Polk, JBL, iBiquity on HD Radio Tagging System for iTunes, (Sep. 6, 2007), available at https://gizmodo.com/apple-to-work-with-polk-jbl-ibiquity-on-hdradio-tagg-297297 (Ex. NPL12 of U.S. Pat. No. 9,294,806 Reexamantion Request filed Jul. 29, 2022).

jbl.com, Products List, (Nov. 4, 2008), available at https://web.archive.org/web/20081104225658/http://www.jbl.com:80/home/products/series_mm.aspx?SerId=HMM&Language=ENG&Country=US&Region=USA (Ex. NPL13 of U.S. Pat. No. 9,294,806 Reexamantion Request filed Jul. 29, 2022).

iBiquity.com, iTunes Tagging for HD Radio™ Broadcasting, (Oct. 12, 2007), available at https://web.archive.org/20071012110119/http:/ibiquity.com/broad casters/tag (Ex. NPL15 of U.S. Pat. No. 9,294,806 Reexamantion Request filed Jul. 29, 2022).

Cornell, Lindsay, The AM Signalling System (AMSS), BBC, Jan. 2006 (Ex. NPL16 of U.S. Pat. No. 9,294,806 Reexamantion Request filed Jul. 29, 2022).

Murphy, Andrew, The AM Signalling System: AMSS—does your radio know what it's listening to?, EBU Technical Review, Jan. 2006 (Ex. NPL17 of U.S. Pat. No. 9,294,806 Reexamantion Request filed Jul. 29, 2022).

RBDS versus RDS—What are the differences and how can receivers cope with both systems?, National Radio Systems Committee, Jan. 1998 (Ex. NPL18 of U.S. Pat. No. 9,294,806 Reexamantion Request filed Jul. 29, 2022).

Savage, Britt, A Guide to Hash Algorithms, SANS Institute, Apr. 18, 2003 (Ex. NPL19 of U.S. Pat. No. 9,294,806 Reexamantion Request filed Jul. 29, 2022).

Polk Audio I-Sonic ES2, John Falcone, CNET, https://www.cnet.com/reviews/polk-audio-i-sonic-es2-review/ (Ex. NPL28 of U.S. Pat. No. 9,294,806 Reexamantion Request filed Jul. 29, 2022).

Declaration of Tim A. Williams, PhD in Request for Reexamination of of U.S. Pat. No. 9,294,806, Executed Jul. 22, 2022 (Ex. NPL29 of U.S. Pat. No. 9,294,806 Reexamantion Request filed Jul. 29, 2022).

Declaration of Tim A. Williams, PhD in Request for Reexamination of of U.S. Pat. No. 9,584,843, Executed Jul. 22, 2022 (Ex. NPL29 of U.S. Pat. No. 9,584,843 Reexamantion Request filed Jul. 29, 2022).

Interview summary dated Aug. 1, 2022 in Reexamination of U.S. Pat. No. 9,294,806 (Reexamination U.S. Appl. No. 90/019,055), in 4 pages.

Interview summary dated Aug. 1, 2022 in Reexamination of U.S. Pat. No. 9,584,843 (Reexamination App. No. 90/019,056), in 4 pages.

Office Action Response dated Jul. 27, 2022 in Reexamination of U.S. Pat. No. 9,294,806 (Reexamination App. No. 90/019,055), in 17 pages.

Office Action Response dated Jul. 27, 2022 in Reexamination of U.S. Pat. No. 9,584,843 (Reexamination App. No. 90/019,056), in 13 pages.

Prosecution History of U.S. Appl. No. 14/481,747 (Ex. NPL21 of U.S. Pat. No. 9,294,806 Reexamination Request filed Jul. 29, 2022).

Prosecution History of U.S. Appl. No. 15/018,658 (Ex. NPL21 of U.S. Pat. No. 9,584,843 Reexamination Request filed Jul. 29, 2022).

U.S. Appl. No. 61/026,433, filed Feb. 5, 2008 (Ex. NPL22 of U.S. Pat. No. 9,294,806 Reexamination Request filed Jul. 29, 2022).

Prosecution History of U.S. Appl. No. 12/366,483 (Ex. NPL23 of U.S. Pat. No. 9,294,806 Reexamination Request filed Jul. 29, 2022).

U.S. Appl. No. 61/026,433, filed Feb. 5, 2008 (Ex. NPL23 of U.S. Pat. No. 9,584,843 Reexamination Request filed Jul. 29, 2022).

U.S. Appl. No. 60/876,857, filed Dec. 22, 2006 (Ex. NPL24 of U.S. Pat. No. 9,294,806 Reexamination Request filed Jul. 29, 2022).

U.S. Appl. No. 60/923,439, filed Apr. 12, 2007 (Ex. NPL25 of U.S. Pat. No. 9,294,806 Reexamination Request filed Jul. 29, 2022).

U.S. Appl. No. 60/916,766, filed May 8, 2007 (Ex. NPL26 of U.S. Pat. No. 9,294,806 Reexamination Request filed Jul. 29, 2022).

U.S. Appl. No. 60/957,648, filed Aug. 23, 2007 (Ex. NPL27 of U.S. Pat. No. 9,294,806 Reexamination Request filed Jul. 29, 2022).

Notice of Intent to Issue a Reexam Certificate dated Sep. 1, 2022, in Reexamination of U.S. Pat. No. 9,294,806 (Reexamination App. No. 90/019,055), in 6 pages.

Office Action dated Sep. 2, 2022, in Reexamination of U.S. Pat. No. 9,584,843 (Reexamination App. No. 90/019,056), in 15 pages.

U.S. Appl. No. 90/019,102, Order Granting Request for Ex Parte Reexamination of U.S. Pat. No. 9,584,843, in 31 pages, mailed Oct. 19, 2022.

U.S. Appl. No. 90/019,103, Order Granting Request for Ex Parte Reexamination of U.S. Pat. No. 9,294,806, in 54 pages, mailed Oct. 19, 2022.

Ex Parte Reexamination Certificate (12143rd) of U.S. Pat. No. 9,294,806 C1 Certificate Issued Oct. 3, 2022.

Request for Ex Parte Reexamination and Exhibits filed Oct. 21, 2022, in U.S. Pat. No. 9,294,806 in 1106 pages.

U.S. Appl. No. 90/015,139, Order Denying Request for Ex Parte Reexamination of U.S. Pat. No. 9,294,806, in 27 pages issued Dec. 8, 2022.

Notice of Intent to Issue a Reexam Certificate dated Nov. 30, 2022, in Reexamination of U.S. Pat. No. 9,584,843 (Reexamination App. No. 90/019,056), in 8 pages.

Office Action Response dated Nov. 2, 2022, in Reexamination of U.S. Pat. No. 9,584,843 (Reexamination App. No. 90/019,056), in 23 pages.

Interview summary dated Nov. 3, 2022, in Reexamination of U.S. Pat. No. 9,584,843 (Reexamination App. No. 90/019,056), in 4 pages.

* cited by examiner

SYSTEMS AND METHODS FOR SCHEDULING INTERACTIVE MEDIA AND EVENTS

CROSS-REFERENCE TO RELATED APPLICATIONS

This application is a continuation of U.S. patent application Ser. No. 17/202,981, filed Mar. 16, 2021, which is a continuation of U.S. patent application Ser. No. 16/689,725, filed Nov. 20, 2019, which is a continuation of U.S. patent application Ser. No. 15/373,987, filed Dec. 9, 2016, which is a continuation of U.S. patent application Ser. No. 14/829,042, filed Aug. 18, 2015, which is a continuation of U.S. patent application Ser. No. 14/137,698, filed Dec. 20, 2013, which is a continuation of U.S. patent application Ser. No. 12/334,400, filed Dec. 12, 2008, which claims the benefit under 35 U.S.C. 119(c) to U.S. Provisional Application No. 61/013,921, filed Dec. 14, 2007. Each of the foregoing applications is hereby incorporated by reference in its entirety, including specifically but not limited to the systems and methods relating to scheduling interactive media and events.

BACKGROUND

Field

The embodiments of the invention relate to the field of interactive media technologies, and in particular, to systems and methods for providing various notifications to user regarding the schedule of interactive media and/or events.

Description of the Related Art

With the development of modern times, it is becoming increasingly difficult to find and schedule time to review, listen, and/or watch broadcasts, and/or scheduled events (for example, sale events, concert events, or the like). Additionally, the development of new technologies and modalities has increased the availability, quantity, and quality of broadcasts and events. As a result, it has become more challenging for people to become aware of the available content and events, and/or where to locate the content. Moreover, technology advancements have resulted in further audience fragmentation, which has in turn made it more difficult for broadcasters and event organizers to garner audience viewership and event attendees, and to generate advertising revenues, product revenues, and/or event revenues.

SUMMARY

In certain embodiments, a system for scheduling interactive media and events comprises: an interactive media transmission associated with at least one event, wherein a unique identifier specific to the instance of the scheduling opportunity is transmitted in association with the interactive media transmission; a database associated with the interactive media transmission, wherein the unique identifier specific to the instance of the scheduling opportunity resides in a look up table; an interactive media receiver; a monitor module to determine whether the notification criteria for the scheduled event has occurred, associated with the interactive media receiver; an input module for a user to select the interactive media transmission received by the interactive media receiver; a communications module for communicating between the interactive media receiver, the monitor module associated with the interactive media receiver, and the database associated with the interactive media transmission, wherein the unique identifier specific to the instance of the scheduling opportunity is communicated to the database associated with the interactive media transmission upon the user selection of the interactive media transmission received by the interactive media receiver; and wherein the at least one event is scheduled in the monitor module after the user selects the interactive media transmission received by the interactive media receiver.

In some embodiments, a system for scheduling interactive media and events comprises: an interactive broadcast media transmission associated with at least one media or an event; a database associated with the interactive broadcast media transmission; an interactive broadcast media receiver; a calendar associated with the interactive broadcast media receiver, wherein the calendar is configured to allow a user to select the interactive broadcast media transmission received by the interactive broadcast media receiver; a communications connection configured to communicate between the interactive broadcast media receiver, the calendar associated with the interactive broadcast media receiver, and the database associated with the interactive broadcast media transmission; and wherein the at least one event is scheduled on the calendar after the user selects the interactive broadcast media transmission received by the interactive broadcast media receiver.

In certain embodiments, a computer-implemented method for scheduling interactive media and events comprises: receiving, in a broadcast receiver device, at least a broadcast, wherein the broadcast comprises an interactive media transmission, at least one option associated with the interactive media transmission, and a unique identifier specific to the instance of the scheduling opportunity of the interactive media transmission, wherein the interactive media transmission is associated with a scheduled event; presenting, using the broadcast receiver device, the interactive media transmission and the at least one option associated with the interactive media transmission; receiving, through an input module connected to the broadcast receiver device, a selection by a user of at least one option associated with the interactive media transmission; transmitting, through a network connection using the broadcast receiver device, the unique identifier specific to the instance of the scheduling opportunity to a schedule delivery system server; receiving from the schedule delivery system server, through the network connection using the broadcast receiver device, scheduling data specific to the interactive media transmission and user scheduling preference data; generating a calendar reminder in the broadcast receiver device based on the scheduling data and the user scheduling preference data, wherein the calendar reminder causes the broadcast receiver device to produce an alert.

In some embodiments, a computer system for scheduling interactive media and events comprises: a scheduler control module configured to operate on a server that receives a schedule for at least event; wherein the scheduler control system associates an interactive broadcast media transmission with the at least one event; wherein the scheduler control module determines an recipient interactive broadcast media receiver, a database associated with an interactive broadcast media transmission; and a scheduling delivery module that communicates the interactive broadcast media transmission associated with the at least one media or event to the interactive broadcast media receiver, a means for communicating between the scheduler control module, the scheduling delivery module, the interactive broadcast media receiver, and the database associated with the interactive broadcast media transmission.

In certain embodiments, a method for scheduling interactive media and events comprises associating at a server an interactive media transmission with at least one event; selecting a recipient interactive media receiver to receive the interactive media transmission; and communicating the interactive media transmission to the interactive media receiver.

For purposes of this summary, certain aspects, advantages, and novel features of the invention are described herein. It is to be understood that not necessarily all such aspects, advantages, and features may be employed and/or achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

BRIEF DESCRIPTION OF THE DRAWINGS

The foregoing and other features, aspects and advantages of the present invention are described in detail below with reference to the drawings of various embodiments, which are intended to illustrate and not to limit the invention. The drawings comprise the following figures in which.

DETAILED DESCRIPTION OF THE EMBODIMENTS

Figure 1:
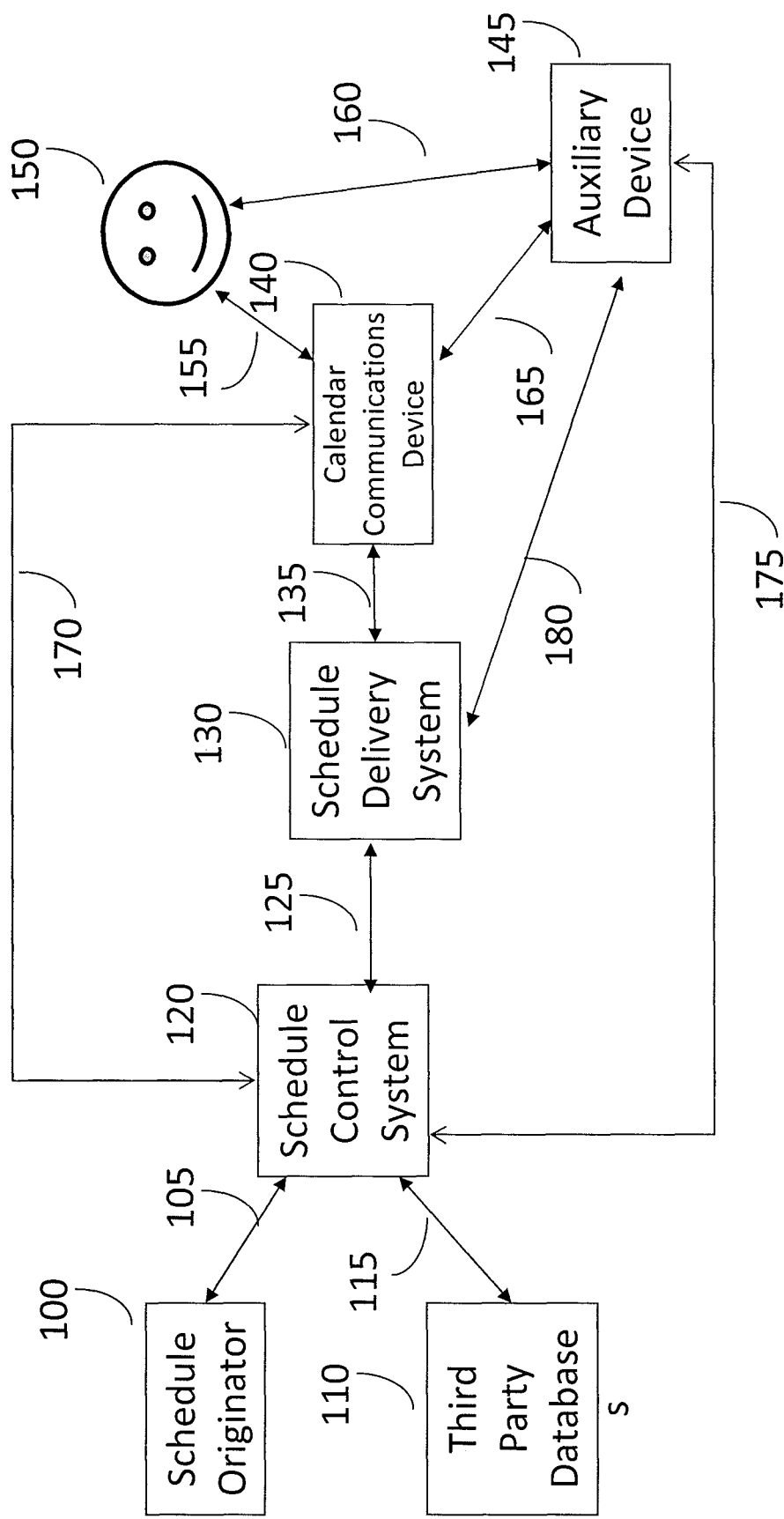
FIG. 1 illustrates one embodiment of a high-level overview of a scheduler system.

Although several embodiments, examples and illustrations are disclosed below, it will be understood by those of ordinary skill in the art that the invention described herein extends beyond the specifically disclosed embodiments, examples and illustrations and includes other uses of the invention and obvious modifications and equivalents thereof. Embodiments of the invention are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the invention. In addition, embodiments of the invention can comprise several novel features and no single feature is solely responsible for its desirable attributes or is essential to practicing the inventions herein described. Numerous technical details are set forth in this description. These details are provided to illustrate various embodiments, and are not intended to limit the inventions. Thus, nothing in this detailed description is intended to imply that any particular feature, characteristic, or component of the disclosed system is essential to the inventions.

The terms "broadcast" or "broadcast stream," "broadcasted media," "show," or "event," "media event," "interactive media transmission," "interactive broadcast media transmission," or "broadcast signal" as used herein are interchangeable and the terms broadly refer to, without limitation, content, data, advertisements, reports, items, broadcasts, sales, concerts, movies, services, stage plays, repairs, maintenance, classes, sporting, dating services or the like, and/or programming distributed over a wide variety of media such as terrestrial radio, over-the-air (or terrestrial) television, cable, satellite, internet, WiFi, Bluetooth, cellular networks, peer-to-peer networks, LAN's, WAN's, or the like.

The terms "broadcast source" or "broadcaster" are interchangeable as used herein, and all terms broadly comprise systems and/or devices that transmit broadcast streams, comprising without limitation broadcast stations and/or towers that transmit radio or television signals, servers or other devices that push data feeds over wired and/or wireless networks, such as the internet, LAN's or WAN's, or the like.

The terms "computer server," or "computing systems," or "computer clients," or "servers," or "computing system devices," as used herein are interchangeable, and the terms broadly refer to, without limitation, a machine that manipulates data according to a list of instructions or the like.

The terms "calendar" or "calendaring tool" are interchangeable as used herein, and all terms broadly comprise systems, components, software, firmware and/or devices that stores a record of the timing for an alert about a future event, monitors the passage of time to determine if the timing for the alert has occurred and when the timing for the alert has occurred, notifies the user using visual, aural and/or other sensory means and interacts with any other devices associated with the scheduled event such as digital video recorders, security systems, lights, media players or the like.

Interactive media technologies provide systems and methods to users for enabling real-time response to media and/or interactive events. When the user has an interest in a broadcast, broadcasted media and/or interactive media events, they can indicate their interest by for example, "pushing the button" on an interactive device, generating a voice command, or clicking on a hyperlink using the Internet through the use of interactive technologies. Interacting with a media event, in real time or otherwise, does not provide the direct ability to schedule a reminder and/or provide access to a media event broadcast at a future time and/or date.

For example, the technology can be used where a media event is advertised as occurring at a time and/or date in the future and/or the user wants to schedule a reminder and/or wants to record the media in parallel to generating an interactive response to the broadcast media of interest. In non-interactive media, a response can be generated indirectly by making a mental note, writing down the schedule for the desired event on a random piece of paper and/or entering the schedule of the event in a day timer, PDA and/or other scheduler.

One issue with these various approaches is that the human mind is subject to forgetfulness, random pieces of paper can get lost, and/or it may not be convenient to enter an event into a calendar, even if the scheduler is available. The inability to remember and/or consistently keep track of notes demonstrates the usefulness of automatically enabling the scheduling of events and/or a reminder of the scheduled broadcast and/or event in relation to the interactive broadcasted media. Further, the inability to easily schedule a reminder of an event extending to recording the same event is problematic.

In certain embodiments, foreknowledge of schedulable events can allow an automated scheduling system to create a unique identifier specific to the instance of the scheduling opportunity for storage in a database server and/or associate that unique identifier with broadcast segments or media elements as they are transmitted to receiving devices. Devices capable of receiving such transmissions can also be capable of receiving and/or processing the unique identifier using programmable software and/or firmware resident on the device.

Identifying information and other data, including without limitation the name of a program, language of transmission, start time, end time, duration and/or other relevant information, can also be transmitted with the program and/or unique identifier. The combination of receiving these elements, whether obtained from a single transmission source and/or multiple transmission sources can provide a basis for establishing the electronic scheduling of an event using an electronic calendaring tool.

In certain embodiments, software and/or firmware resident on the receiving device and/or in some cases resident on a second device related to the receiving device, can have the ability to interpret the scheduling information and/or can format that data for storage in the electronic calendaring software. The software can increase the odds of successfully enjoying the media event. For example, the software can manipulate notification tools such as audio and/or visual alarms on the first receiving device and/or a second associated device, and/or can set the device into the record mode at a specific time to capture a schedule event.

The database server can provide full flexibility for users. For example, the database server can receive and/or store settings based on user preferences (for example, sending an alert or setting a calendar reminder five minutes before a scheduled broadcast or event), support transmission of a single scheduled broadcasts and/or event to multiple users whether in a fixed location and/or mobile location, and/or can allow for indeterminate start and/or end times for scheduled broadcasts and/or events. The calendar functions can be centralized so that the alert is tracked in the central database server and a notification sent to at least one user at the appropriate time and/or the calendar functions can be distributed across multiple devices either using peer-to-peer, broadcast and/or Internet Protocol to provide the alert to the user and/or notification to other electronic devices.

In certain embodiments, flexible methods can effectively schedule a reminder for an event in the future using tools such as an electronic calendar and/or Java, J2ME, BREW, Windows, Symbian, Mac OS and/or similar coding algorithms. Flexible methods can effectively electronically record an event based on a broadcasted media event and/or receipt of an electronic invitation to schedule an appointment. Flexibility in creating reminders and/or digitally recording of events can be provided. A flexible method can support effective scheduling for some and/or all of the various event types.

System effectiveness can also depend on the type of event being scheduled. Scheduling of some events can be handled by a machine where some and/or all of the receipt of information, processing by software, and/or scheduling in an electronic calendaring system can occur automatically. In certain embodiments, scheduling of events can be handled without human intervention. Some events have a definitive start time and/or end time, and/or can be scheduled with precision.

In certain embodiments, other events may have a changeable start time and/or a dependent end time (for example, sporting events at the Olympics may wait for good weather and/or overtime games may run beyond the scheduled end time), and/or can be rescheduled (for example, in the case of breaking news offsetting a previously scheduled program). Other events may use additional information before completing the scheduling of a reminder and/or recording. Scheduling a reminder of an event can serve as a reminder to complete a future scheduling and/or digital recording task.

The user can respond to a media segment wherein the media segment may be associated with a schedulable event. Software on the device can then schedule the event into an electronic calendar system, and/or may use data associated with the media segment. At the appropriate time, the electronic calendar system may notify the user of the scheduled broadcast and/or event.

In certain embodiments, different event types can benefit from an improved method of scheduling and/or recording. Events can be categorized in association with event types. Some events can be categorized in association with multiple event types depending on the event and/or the user.

An event that has a fixed start and/or end time can be scheduled and/or digitally recorded, such as a TV show. For example, if a user heard an advertisement for a TV show using interactive broadcast media, they can indicate their interest in the program by, for example, using the immediately available interactive method such as pushing a button and/or clicking on a hyperlink on the interactive device. Information regarding identifying the media event, the day and/or time of broadcast, the source of broadcast, and/or other relevant information can be forwarded to an electronic calendaring system.

In certain embodiments, the system can present a schedulable broadcast and/or event to the user, receive the request from the user to schedule the event, store the scheduled broadcast and/or event, monitor to see if the notification criteria for the scheduled broadcast and/or event has occurred, and/or present a notification that the scheduled broadcast and/or event notification criteria has occurred. The schedulable broadcast and/or media event, also known as a scheduling opportunity, presented to the user can be accompanied by a unique identifier specific to the scheduling opportunity. When the user selects the scheduling opportunity for scheduling, the request from the user to schedule the broadcast and/or event can be accompanied by the request so that the schedule control system storing the unique identifier specific to the scheduling opportunity, can retrieve any details associated with the scheduling opportunity required to complete the scheduling. The use of the unique identifier specific to the scheduling opportunity can have advantages in the system by reducing the bandwidth required to be sent with the user's request to schedule. Rather than send all the information about the scheduling opportunity back to the system server, at least the unique identifier specific to the scheduling opportunity can be sent and used as a key into the database to retrieve the information needed to complete the scheduling. Alternatively, all the information needed to complete the scheduling opportunity can be sent before and/or as the scheduling opportunity is presented to the user including identifying information about the user. Once received, the electronic calendaring system can add an event in addition to the activation of a visual, audible, and/or textual alarm noting, for example, the exact time of the broadcast and/or a time before the broadcast allowing the user to prepare for the broadcast. In certain embodiments, the alarm and/or alert can be specific to the broadcast and/or event. For example, the alarm can comprise acquisition and/or presentation of the theme song for the scheduled program, a catch phrase from the program, and/or a message about the specific program that was scheduled.

The system can present the scheduled broadcast and/or event notification with an alarm associated with the scheduled broadcast and/or event. The same information sent to the electronic calendaring system can also be sent electronically to a digital recording device capable of receiving electronic control messages such as through an internet protocol, WiFi connection, SMS, email, and/or other electronic methodology. The system can communicate the scheduled broadcast and/or event to a second device, wherein the second device can respond when the scheduled broadcast and/or event notification criteria occurs.

In certain embodiments, a data server, such as a proprietary and/or third party data server, can also be used to modify and/or control the beginning and/or end time of events where the beginning and/or end times can be transient. The end user can opt-in to the service where the data server can send out notification of the beginning and/or end time of an event as a reminder, as a code for an electronic recording device to start and/or stop recording and/or both. The electronic recording device can digitally record or otherwise record the scheduled broadcast and/or event for presentation at a later time.

The system can adjust the notification criteria of the scheduled broadcast and/or event after the scheduling of the scheduled broadcast and/or event. Flexible scheduling and/or recording can provide the user additional features. After showing an interest in scheduling an event and/or appointment through the generation of an interactive response, the user can be presented with options of how to schedule and/or digitally record an event. The start time of a program is scheduled into a local calendar in the interactive media device. For example, a cell phone with an integrated interactive broadcast media receiver and/or other devices can be used for this purpose.

In certain embodiments, the user can be presented with the option to schedule multiple associated events into the calendar, such as for each new episode of a TV series. The system can present the user with the option to schedule a plurality of associated events. Some examples of other devices which can support integrated interactive broadcast media may be: computers (including laptops), electronic personal digital assistants, automotive entertainment systems, digital video recorders, digital audio devices, digital media devices, GPS devices, radios, televisions, and/or the like.

Beginning with the cell phone enabled with an interactive media receiver, the user's indication of interest in the interactive broadcast media event can be indicated by, for example, the press of a button on the device, through clicking on a hyperlink, and/or by issuing a voice command. The response can occur at the time of the broadcast, by looking through a history of broadcast media events that have been received on the interactive device, and/or by going to a web site with a history of broadcast media events that have been broadcasted.

In certain embodiments, the system can store a history of the scheduled events, present the history of scheduled events, and/or can receive a selection of one of the scheduled events in the history of scheduled events. The user can then be presented with a range of possible responses in relation to the interactive broadcast media event. In addition to more common interactive broadcast media event responses, categorically designated responses can allow events to be marked with indicia indicating an association with the interactive broadcast media event subject, for example, a TV show about World War II. The system can offer alternative and/or associated choices to the user based on what others have selected, past selections of the user, and/or the demographics of the user.

The system can present the user with additional schedulable events, wherein the additional schedulable events may meet association criteria to match the additional schedulable events and/or the user. Events can then be organized into an electronic calendaring function integrated into the cell phone and/or other devices containing the interactive broadcast media receiver. Events can be stored and/or searchable under the specific event, the event category, other categories, and/or other criteria. The start date, end date, source of broadcast, identifying information, category, original media form, and/or time for the programming can be sent along with any other interactive broadcast media event data.

In certain embodiments, the system can communicate data associated with the scheduled event to a device designated by the user. Alternatively, pushing the button, clicking on a hyperlink and/or generating a voice response could connect the user, through, for example, the use of cell phone network, wifi, bluetooth and/or other similar technologies to, for example, a database. The database can contain additional details of the interactive broadcast media events such as start and/or end times, duration, language, and/or the like.

The system can present the user with data associated with the schedulable event. A human accessible mnemonic can be entered into the electronic calendar to return, for example, stored information about the programmed media such as broadcast time and/or broadcast source. The system can present the user with the option of designating a device to store the scheduled event. The system can present the user with the option of designating which device to assign a given portion of the scheduling, storing, and/or responding to scheduled events.

In certain embodiments, the user can be prompted by a variety of different methods if an alarm is desired, and/or can use a pre-stored preference to automatically set an alarm. Examples of alarms can be no alarm, a default stored alarm, an alarm using musical and/or audio elements which can be specific to the exact media event (comprising, for example, theme songs, actors voices, sound effects, audio and/or video previews about the programming, and/or the like), an alarm in advance of the scheduled time with the amount of advanced time being selected by the user and/or going with a pre-stored default, an alarm on the day of the event, an alarm coordinated with a GPS system such that a database server may contain the time, and/or geographic location. Alarms can be, comprise, and/or be based off a broadcast source and/or other relevant indicia about the media event, an estimate of the location of the user based on location and/or provide warning in advance of the broadcast media event such that the user has time to travel to a desired location for the broadcast, and/or an alarm at the time of the event.

Using these various technologies, the user can effectively "close the loop" between learning about a scheduled broadcast of a program of interest and catching the program for interest. This can occur by, for example, setting a preference for notification using a database server; interactively generating a response to an advertisement of a media event; getting a reminder through the calendar integrated with their interactive broadcast media receiver when the show starts, and/or just before the show starts. The interactive broadcast media receiver and/or the calendar may not be on the same device, but can be two and/or more devices that are connected wirelessly, via a wired network, serial cable, and/or the like.

In certain embodiments, other methods available for providing a reminder, can comprise: email messages, instant messages, pop up windows, a text message, a database server generated IP data packet, text messaging, peer to peer networks, a phone call, turning on a device such as a television, a facsimile, and/or other methods. The system can activate a response in a remote device designated to respond to the scheduled event. Some and/or all of the methods can be instigated by one and/or more remote database servers, a user device, and/or various combinations of both.

The systems and methods described above can also comprise an electronic calendar on a second device distinct from the device receiving the interactive broadcast media. Examples can comprise: computers, personal digital assistants, digital video recorders, digital audio devices, radios, mobile, and/or cellular telephones, and/or the like. The database server can contain information about various devices that can support and/or allow the user to select which device and/or multiple devices to store and/or record each scheduled event and/or appointment. The link to the second device can be a direct link connecting the integrated interactive broadcast media device such as a cell phone and/or digital audio device through a wireless connection and/or physical docking.

In certain embodiments, the system can store the scheduled event on multiple devices. In certain embodiments, the system can store the scheduled event in a device different from the device that received the schedulable event. In certain embodiments, where a single user may own multiple devices supporting electronic calendaring, the user can designate transmitting scheduling of events to some and/or all devices. This can ensure that regardless of the device being used at any particular time, the user can be notified of the scheduled event.

Users with peer to peer relations can also benefit from parallel scheduling. For example, in the case of married couples, business associates, and/or other peer to peer relations, scheduling of events can occur on multiple devices simultaneously as defined by pre-established parameters of the users, and/or of an association and/or select group to which the users belong. Alternatively, the integrated broadcast media device can connect to a database server that can in turn connect to a second device to coordinate calendar based reminders, notifications, and/or record the scheduled event. Compliant devices can record the program, and/or can remind the user that the programmed media is being broadcast. This feature can provide the user with the ability to time shift the presentation of the media to fit their schedule.

In certain embodiments, some media events can be first broadcast according to a prearranged schedule, and/or with repetitions of the media event broadcast in syndication. Examples can comprise: radio programs, television shows, movies, concerts, streamed events via the internet, sporting events and/or advertisements. Other examples can be a program that is broadcasted multiple times, broadcast at multiple locations, broadcast from multiple sources and/or broadcast on a variety of dates and/or times. A user can use an interactive technology to respond as above, but can also pick a time from a plurality of times that the event was broadcast. For example, dates of broadcast, source of broadcast, language of broadcast, conditional access related to a broadcast, categorical nature of a broadcast, and/or geographical location of the broadcast can affect the scheduling and/or recording of the media event the user wants scheduled in the calendar. The system can present the user with alternative notification criteria from which the user can select a preferred notification criteria to be associated with a scheduled event.

For example, in the case of a movie and/or similar programming, scheduling can comprise the opportunity to buy a ticket for the desired and/or related event. This option can take multiple negotiations between the user, the integrated interactive broadcast media device, and/or the venue selling the tickets and/or their agents. A credit card and/or other payment methods can be used to pay for and/or confirm details regarding acquisition of the tickets. The system can respond to the user request to schedule a schedulable event with the offer to reserve a resource associated with the scheduled event.

In certain embodiments, interactive scheduling can be done for events that do not have a definitive start time, but can occur over a range of times. An example may be a sale occurring at a store and/or the hours of the sale, rather than a specific time for the sale. The system can notify the user repeatedly until notification cessation criteria may be met. Additional information about this type of event, such as the store name, address, GPS information, phone number, website, coupon code, special instructions, password, and/or the like can be in the calendar entry with the data directly accompanying the interactive broadcast of the event and/or indirectly through a database. The system can store additional data associated with the scheduled event in the device containing the stored scheduled event.

For example, there may be situations where the event time may be negotiated before scheduling and/or recording. The negotiation can occur over terms such as: price, time of presentation, level of skill preferred as in the case of scheduling an interactive gaming event, conditional access geographic location, language, and/or the like. An example can be a professional service setting appointments for customers. The service can advertise through an interactive media broadcast and/or peer to peer connection. A user can receive the broadcast and/or express an interest by, for example, pressing a button, generating a voice command, clicking on a hyperlink and/or other interactive response when the ad is broadcasted, and/or after the broadcast by selecting the ad from an electronic history of interactive broadcasts received.

In certain embodiments, the negotiations can occur via: machine-to-machine, user to machine, user's machine to a person, and/or user to person (peer to peer). For example, in the case of machine to machine, a software module interacting with the electronic calendar associated with the user's interactive broadcast media device can compare the times when the user was available to the service provider's electronic calendar available times. In certain embodiments, based on the user's preferences, the appointment can be automatically scheduled without user involvement and/or the user could confirm the appointment, request another time, adjust the scheduling to a to-do list, request another person to complete the scheduling, and/or abandon the scheduling attempt.

For example, in the case of user to machine, after the user has indicated an interest in the interactive broadcast media event, the service provider's machine can communicate with the user to present available times, broadcast sources, formats, and/or the like. This can start with available time suggestions, sources, formats, by querying the user on their preferences, and/or the like.

In certain embodiments, for example, in the case of user machine to person, after the user has expressed interest in the interactive broadcast media event and/or category, the person can view available slots based on the user device calendar and/or complete the scheduling and/or appointment. The user can automatically accept the scheduled event and/or appointment, allow user approval before the scheduled event and/or appointment is accepted, and/or review the scheduled event and/or appointment at a later time.

The system can present the user with options associated with the media segment, respond to the user option selection, and/or confirm applicability of the user option selected. For example, the case of user to person (peer to peer) can facilitate a connection that can allow the user to interact with a second person to make their scheduled event and/or appointment selection. One user can schedule an event for a friend where a reminder, alarm and/or scheduled recording of the event can occur on the friend's local and/or remote device, and/or on a separate remote server. The system can transmit a schedulable event option to a second user. Multiple variations of the dialog between an interactive broadcast media source, interactive devices, associated electronic calendar and/or interactive broadcast media data servers, and/or peer-to-peer services are provided.

In certain embodiments, as part of the interactive scheduling, appointment, and/or digital recording process, selection and/or confirmation of calendar events and/or appointments can be automatically set. This can provide the user the ability to opt-out once the schedule and/or appointment selection is accepted, unless the user opts out of the automatically scheduling feature. An example of this feature can be a time share reservation system where the user specifies a desired date range for reserving accommodations, but where the user may not determine immediately which dates are available. Once the automated reservation system provides the user with an acceptable option, the user can opt-out of any further attempts to schedule time with the time-share service until the next season.

The user also can opt-out and/or completely cease any further attempts to schedule dates at any time in the future. The system can remind the user of a scheduled event with incomplete criteria selection. The system can store schedulable events, wherein the user has not met some and/or all scheduling criteria. The system can schedule two episodes of a television and/or radio series and/or opt out after receipt of the two episodes. Alternatively, event scheduling, recording, and/or confirmation can be performed through an opt-in procedure, where the user can perform an action to accept each media event schedule and/or appointment selected. The system can notify the user of conflicts with the scheduled event. The confirmation can be a positive confirmation; yes or no, to a selection made from a choice and/or selections made by the user, and/or it can comprise actions such as identity verification and/or a charge to a credit card.

In certain embodiments, there can be cases where the user cannot complete an interactive schedule selection and/or accept an appointment. For example, the user may change their mind on scheduling the event and/or they may want to delay scheduling of the event. Options can allow the user to cancel the selection, automatically cancel a selection if the user does not continue in a timely manner, send a reminder by phone, mail, text message, instant message, facsimile, email, post the reminder on a web site, and/or the like. The system can receive a scheduled event notification criteria change from, for example, the user before the scheduled event occurs. Options can allow the selected event schedule to be moved to an electronic to-do list associated with the user for the user to review, and/or act on at a later time. The system can store previously scheduled events for future access by the user.

The scheduling options described can be achieved if the user has created a user profile online, in a private database server, and/or the like. In certain embodiments, the system can report scheduled events with selected data associated with the scheduled events. The online and/or database server user profile can store important information about the user, such as interests for the interactive broadcast media provider and/or professional services to better understand the user, and/or to better complete the scheduling process. The profile may prevent the user from duplicating information; may allow the user to modify their account, when for example, life changes occur such as moving, marriage, changing service providers such as email, cellular, and/or ISPs; and/or the like may occur. The user profile can reflect the user's privacy and/or security selections as to preferences the user may want to establish in relation to the scheduling interaction.

The decision to schedule an event could be prompted by a broadcast message and/or an interactive media transmission, for example, a television show, and/or advertisement, and/or an opportunity vote. If the user wants to schedule in the calendar when future airings and/or broadcasts of the show, content, and/or broadcast could take place and/or advertised could take place, the user could make that selection and/or indicate/program the system with that scheduling practice. This could schedule the next episode and/or the user could be presented with one and/or more future episodes to determine which could be scheduled into the calendar and/or re-broadcasts of the current episode being shown could be provided as an option for scheduling. In certain embodiments, other episodes that might appeal to the user based on their selection of the show and/or broadcast could be presented as additional and/or alternative scheduling options. If the future airing and/or broadcast dates are not yet determined, the system could note the interest and/or provide the scheduling opportunity to the user at a later date when the broadcast schedule is determined and/or changed.

The scheduling could be possible between two user devices with calendars directly. The two devices could perform a protocol handshake to share information, compare the available schedule appointments on one device with the open calendar spots on the other device and/or provide the users with a selection to choose from. The user devices can apply a selection criteria that prioritizes the comparison of available appointment dates. The criteria can use the length of the event being scheduled, the time to elapse before the scheduled appointment and/or the potential providers availability compared to preferences for providers. The length of time could comprise a minimum and/or maximum amount of time that the scheduled broadcast and/or appointment should occur. A single choice may be presented for acceptance and/or rejection and/or multiple choices are presented to be selected from and/or for other options to be generated. Such a system could allow for scheduling of events, including without limitation doctors visits, service calls, hair appointments, car maintenance, sales events, appointments, movies, plays, converts, test drives, maintenance reminders, or the like.

The scheduling of an event could be communicated to a database. The information communicated could comprise at least one of the following: the scheduled event, the user identification of the person scheduling the event, the identification of the calendar the event is scheduled on, an identification of what prompted the scheduling of the event, what options were offered to the user but not selected, what options were offered to the user and selected, the time and/or date of the scheduled event, the time and/or date the scheduling in the calendar occurred, the time and/or date of what prompted the scheduling and/or the device being used to schedule the event. If a user starts to schedule and then abandons the process, that information could be communicated to the database. The identification can be by content, type, and/or uniqueness to each specific occurrence. Thus the identification could have different levels of granularity in the specification of the above information. On one level the identification may indicate that a show on a specific network was scheduled. On another level of identification granularity, the identification could be unique to the specific instance of what prompted the scheduling, the specific event scheduled, the specific calendar scheduled on, and/or the specific options accepted and/or rejected in the process of scheduling. The uniqueness of the identifiers will depend on the level of reporting from the database desired. Highly specific identification can be aggregated to more abstract levels. For example, if the database had the specific instance of what prompted the scheduling, the specific event scheduled, the specific calendar scheduled on, and/or the specific options accepted and/or rejected in the process of scheduling, the report may aggregate that event into a summary of the number of events scheduled into the calendar for the network that the broadcast/show is on. The database can link additional information about the identifiers within the database.

FIG. 1 illustrates one embodiment of the scheduler system. The schedule originator 100 (for example, an advertiser/broadcaster using a web browser to submit data to the schedule control system 120) can place the scheduling opportunity with the schedule control system 120 using communication link 105. As part of placing the scheduling opportunity, the schedule originator 100 can select what calendar communications devices 140 the schedule should be targeted for, the preferred schedule deliver system 130, associated material to go with the scheduling opportunity such as an advertisement for the program that can be scheduled and/or similar options. The scheduler originator 100 can transmit, send, and/or indicate its selections to the schedule control system 120 using communication link 105. The schedule control system 120 can access databases internal to the schedule control system 120 and/or third party database 110 using communication link 115 as part of preparing the scheduling opportunity to the calendar communications device 140 including any additional information associated with the scheduling opportunity. The schedule control system 120 can also determine the unique identifier specific to the instance of the scheduling opportunity by either internally generating the unique identifier specific to the instance of scheduling opportunity and/or obtaining the unique identifier specific to the instance of scheduling opportunity from another source such as the third party databases 110 and/or schedule originator 100. The unique identifier specific to the instance of scheduling opportunity can then be communicated to the schedule delivery system 130 using communication link 125. In addition to the unique identifier specific to the instance of scheduling opportunity, additional information about the event that can be scheduled and/or the details to complete the scheduling can also be communicated to the schedule delivery system 130.

In certain embodiments, the schedule delivery system 130 communicates at least the unique identifier specific to the instance of scheduling opportunity specific to the instance of scheduling opportunity to the calendar communications device 140 using communication link 135. In addition, additional information associated with the scheduling event or broadcast can be sent with the unique identifier specific to the instance of scheduling opportunity, including but not limited to program information, scheduling information, alert settings, and/or the like. The nature of the communication link 135 depends on the calendar communications device 140. In some systems, the transmission of the unique identifier associated with the scheduling event may use a one way path, for example with RDS and/or satellite radio. In other systems, the transmission of the unique identifier associated with the scheduling event uses a bidirectional communication path, for example a cell phone/wireless device connection and/or internet.

The calendar communications device 140 may be associated with an auxiliary device 145 and/or the calendar communications device 140 may perform the schedule timing function itself. The calendar communications device 140 may receive the unique identifier specific to the instance of the scheduling opportunity, the user 150 may use the calendar communications device 140 to decide to schedule the event and the auxiliary device can be used to perform the timing function to alert the user when the scheduled broadcast and/or event is to occur. For example, in certain embodiment, the calendar communications device 140 is a cell phone configured to allow the user to select scheduled broadcasts/events on the cell phone 140. The cell phone 140 can be configured to return the unique identifier associated with the scheduling broadcast and/or event to the schedule control system 120, and the scheduling control system 120 can be configured to send the scheduling event data to digital video recorder 145 to perform the schedule timing operation. The return path of the unique identifier specific to the instance of scheduling opportunity can be directly from the calendar communications device 140 to the schedule control system 120 using communication link 170, or the return path can be from the calendar communications device 140 to the schedule delivery system 130 using communication link 135 and then from schedule delivery system 130 to schedule control system 120 using communication link 125, or the return path can be through the auxiliary device 145 using communication link 165. The return path from the auxiliary device 145 can be directly to the schedule control system 120 using communication link 175, through the schedule delivery system 130 using communication link 180 and/or back through the calendar communications device 140 using communication link 165.

The user interfaces 155 and/or 160 to the user 150 can be video, audio, tactile and/or a combination. For example, a cell phone 140 could have a display screen, a keypad input, an audio input and/or an audio output as part of the user interfaces 155 and/or 160. The communication links 105, 115, 125, 125, 165, 170 and 175 are all shown as bidirectional communication paths, but depending on the nature and requirements of the system they may be unidirectional communication paths.

Figure 2:
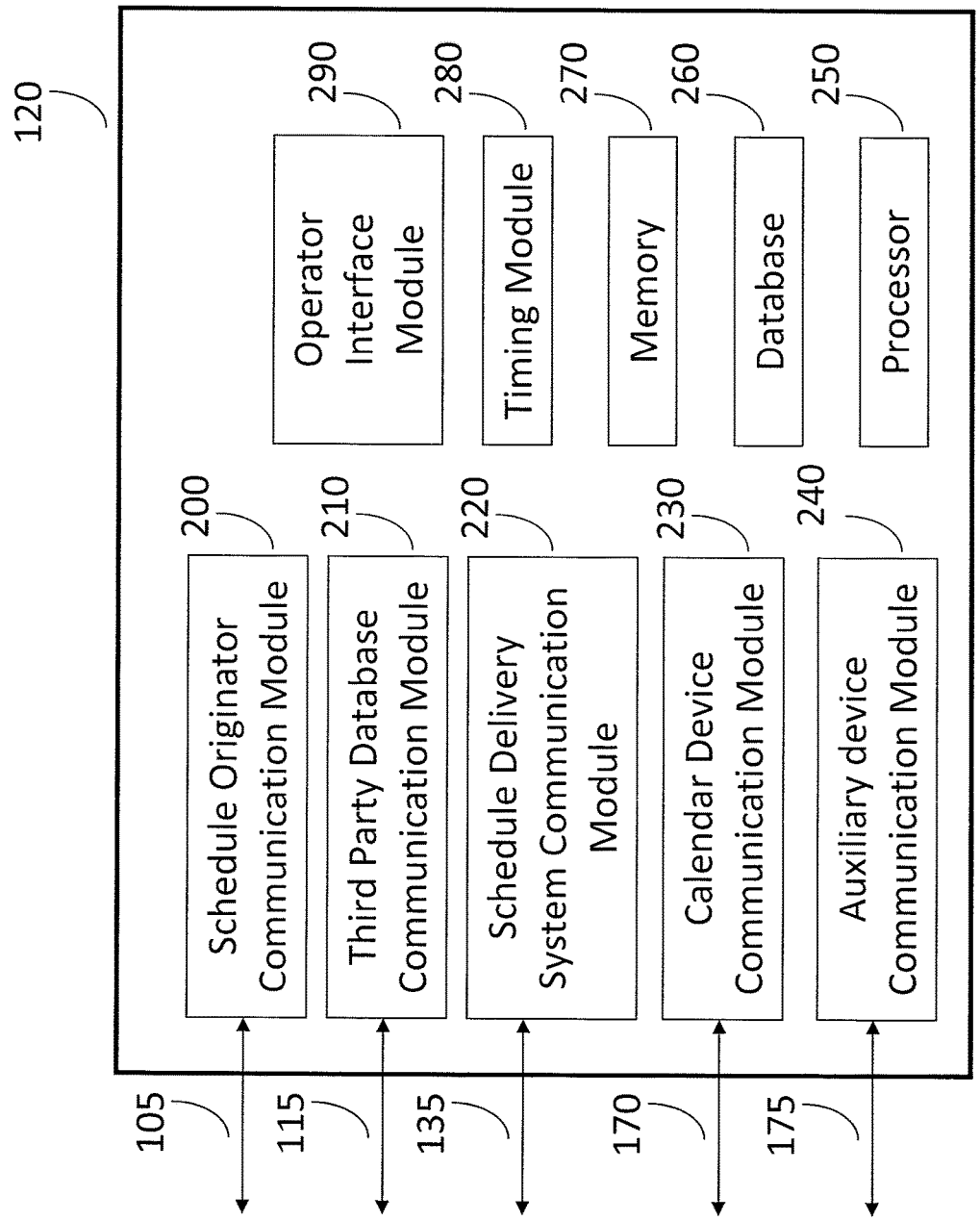
FIG. 2 illustrates one embodiment of a schedule control system.

FIG. 2 illustrates one embodiment of the schedule control system 120. The communication links 105, 115, 135, 170 and 175 are as described from FIG. 1. The presence and/or absence of elements of the system, such as third party database 110 and/or auxiliary device 145 can determine the presence and/or absence of the corresponding communication link and/or communication module. The nature of the communication modules 200, 210, 220, 230, and 240 can depend on the nature of the corresponding communication links. The communication modules 200, 210, 220, 230, and 240 may be self contained and/or use processor 250 and/or memory 270. The memory 270 can contain the program and/or data needed to operate the schedule control system 120. The processor 250 can comprise special purpose circuitry such as encryption circuitry. The database 260 can store the unique identifiers and/or associated schedule information so that when a unique identifier is returned, the unique identifier can be used as a key into the database allowing for retrieval and/or transmission of the correct scheduling broadcast and/or event information. The timing module 280 allows for a check to be made if the scheduling event associated with the returned unique identifier is still valid. If the scheduling event is valid, the associated scheduling information can be sent to the calendar communications device 140 and/or the auxiliary device 145 as appropriate. If the scheduling event has passed, a message indicating that the scheduling event has expired and/or a message indicating an alternative scheduling broadcast and/or event can be sent to the calendar communications device 140 and/or the auxiliary device 145. The operator interface module 290 allows for input into the schedule control system 120 and/or for output such as reports to be generated. By tracking the unique identifiers being sent from and/or returned to the schedule control system 120, the efficacy and/or popularity of scheduling campaigns can be determined. The unique identifiers specific to the instance of scheduling opportunity can be determined in the schedule control system 120. The determination can be accomplished by generation of the unique identifiers specific to the instance of scheduling opportunity using the processor 250, program code stored in the memory 270, and/or the database 260, and/or by means external to the schedule control system 120 such as through the third party database 110.

Figure 3:
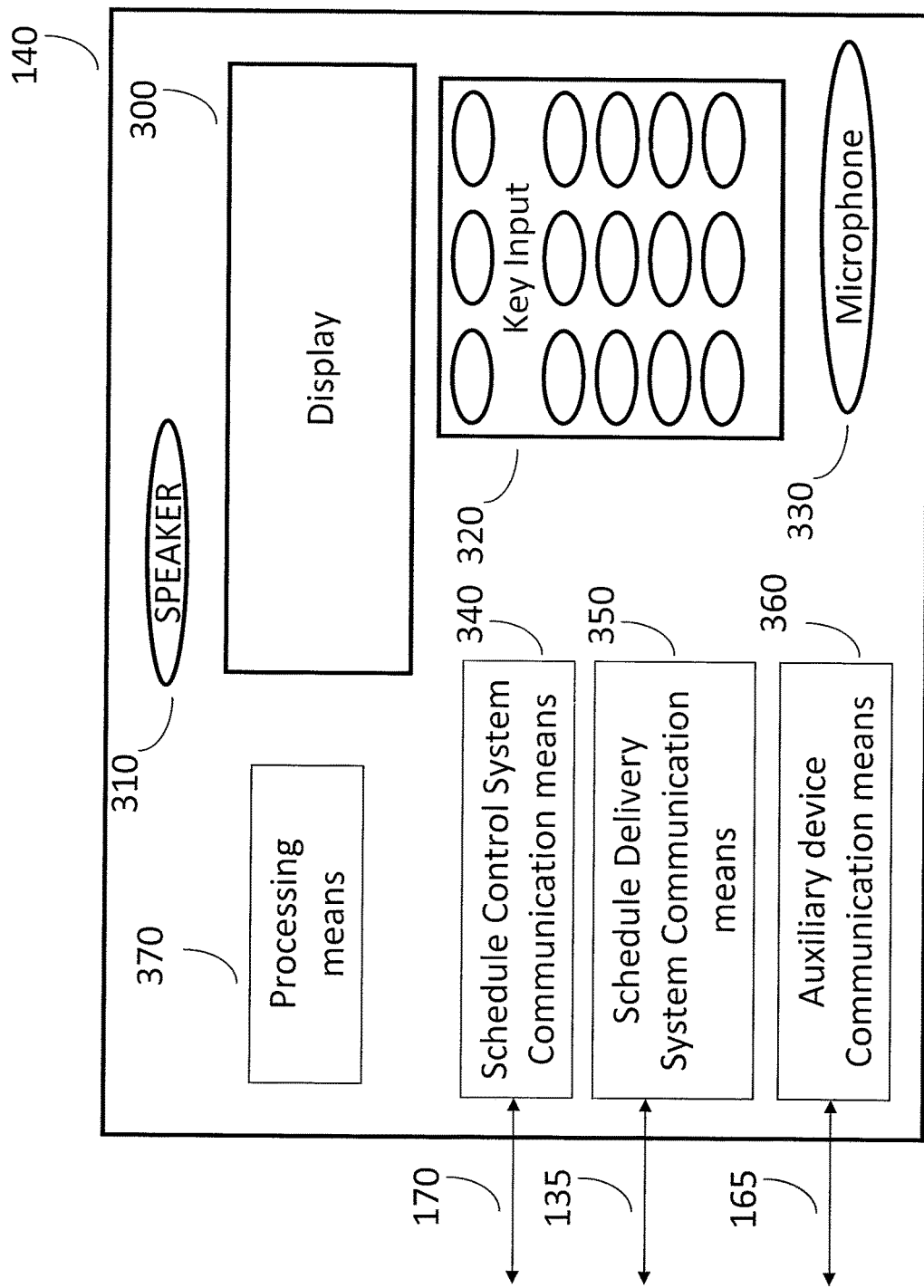
FIG. 3 illustrates one embodiment of a calendar communications device.

FIG. 3 illustrates one embodiment of the calendar communications device 140. The calendar communications device 140 can include a communication module and/or means that comprises at least an input and/or an output. Shown are communication module 350, 340 and 360 for communicating to the schedule delivery system 130 using communication link 135, schedule control system 120 using communication link 170 and auxiliary device 145 using communication link 165. The communication module 340, 350 and 360 are shown independently, but they may be combined depending on the nature of the communication protocols and/or optionally eliminated for example if there is not an auxiliary device 145 in the system. The user interface 155 can comprise a display 300, a speaker 310, a key input 320, and/or microphone 330. The processing module 370 comprises the processor, memory, program code, and/or similar elements to operate the communication module 340, 350, 360 and user interface 155 in addition to providing the timing elements to alert the user when the scheduled broadcast and/or event occurs. The unique identifier specific to the instance of scheduling opportunity and/or any additional information about the scheduling opportunity can arrive and/or be transmitted through communication link 135 and/or be presented as appropriate on display 300. The user can use the key input 320 and/or the microphone 330 to select the scheduling opportunity. The unique identifier specific to the instance of scheduling opportunity can be returned directly and/or indirectly to the schedule control system 120 through one of the communication module 340, 350, 360. The information needed to schedule the event may be delivered with the unique identifier specific to the instance of scheduling opportunity and/or as a direct and/or indirect response from the schedule control system 120 having received the unique identifier specific to the instance of scheduling opportunity response of the calendar communications device 140. The processing module 370 schedules the event and/or at the appropriate time alerts the user using the speaker 310 and/or the display 300 and/or other alerting module and/or apparatus, a vibration apparatus.

Computing System

It will be understood by one of ordinary skill in the art that the following embodiments of computing systems, computer clients, servers, computing system devices, and/or the components related thereto can be used in any of the embodiments described herein.

Figure 4:
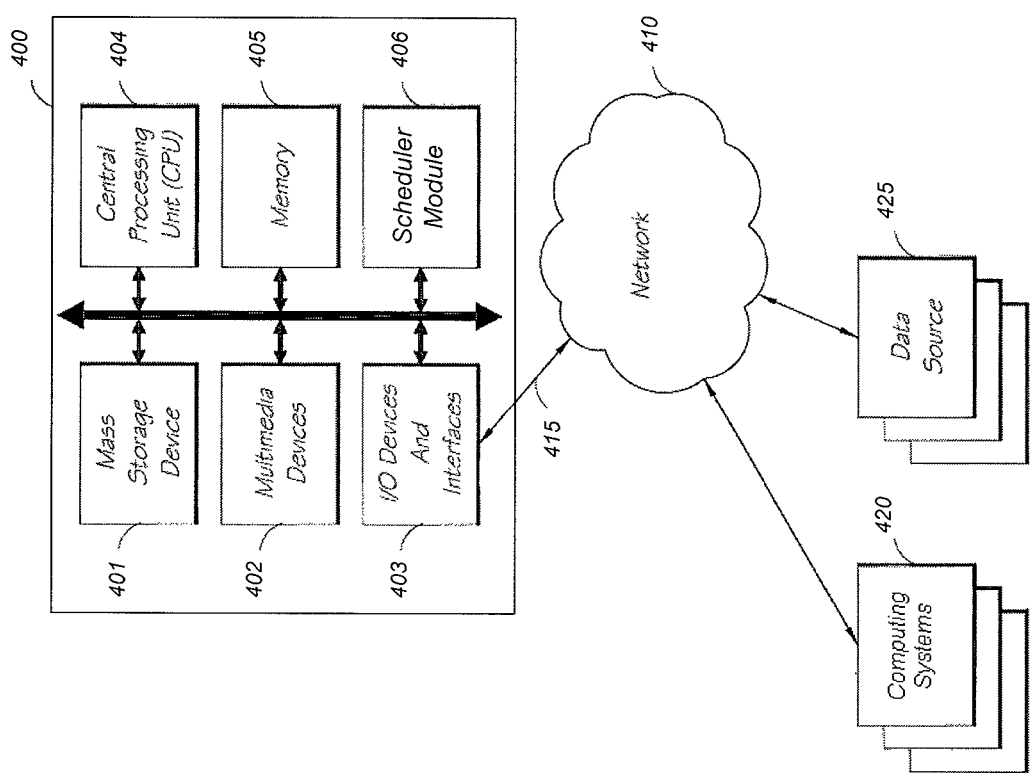
FIG. 4 illustrates a block diagram depicting one embodiment of a computer hardware system configured to run software and/or hardware for implementing one or more embodiments of the scheduler systems, schedule control systems, and/or the calendar communications devices.

In certain embodiments, the systems, computer clients and/or servers described above take the form of a computing system 400 shown in FIG. 4, which is a block diagram of one embodiment of a computing system (which can be a fixed system and/or mobile device) that is in communication with one and/or more computing systems 420 and/or one and/or more data sources 425 via one and/or more networks 410. The computing system 400 may be used to implement one and/or more of the systems and methods described herein. In addition, in one embodiment, the computing system 400 may be configured to process image files. While FIG. 4 illustrates one embodiment of a computing system 400, it is recognized that the functionality provided for in the components and modules of computing system 400 may be combined into fewer components and modules and/or further separated into additional components and modules.

Client/Server Module

In one embodiment, the system 400 comprises a scheduler module 406 that carries out the functions, methods, and/or processes described herein. The scheduler module 406 may be executed on the computing system 400 by a central processing unit 404 discussed further below.

Computing System Components

In one embodiment, the processes, systems, and methods illustrated above may be embodied in part and/or in whole in software that is running on a computing device. The functionality provided for in the components and modules of the computing device may comprise one and/or more components and/or modules. For example, the computing device may comprise multiple central processing units (CPUs) and a mass storage device, such as may be implemented in an array of servers.

In general, the word "module," as used herein, refers to logic embodied in hardware and/or firmware, and/or to a collection of software instructions, possibly having entry and exit points, written in a programming language, such as, for example, Java, C or C++, or the like. A software module may be compiled and linked into an executable program, installed in a dynamic link library, and/or may be written in an interpreted programming language such as, for example, BASIC, Perl, Lua, and/or Python. It will be appreciated that software modules may be callable from other modules and/or from themselves, and/or may be invoked in response to detected events and/or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays and/or processors. The modules described herein are preferably implemented as software modules, but may be represented in hardware and/or firmware. Generally, the modules described herein refer to logical modules that may be combined with other modules and/or divided into sub-modules despite their physical organization and/or storage.

In one embodiment, the computing system 400 also comprises a mainframe computer suitable for controlling and/or communicating with large databases, performing high volume transaction processing, and generating reports from large databases. The computing system 400 also comprises a central processing unit ("CPU") 404, which may comprise a conventional microprocessor. The computing system 400 further comprises a memory 405, such as random access memory ("RAM") for temporary storage of information and/or a read only memory ("ROM") for permanent storage of information, and a mass storage device 401, such as a hard drive, diskette, and/or optical media storage device. Typically, the modules of the computing system 400 are connected to the computer using a standards based bus system. In different embodiments, the standards based bus system could be Peripheral Component Interconnect (PCI), Microchannel, SCSI, Industrial Standard Architecture (ISA) and Extended ISA (EISA) architectures, for example.

An embodiment of the computing system 400 comprises one or more commonly available input/output (I/O) devices and interfaces 403, such as a keyboard, mouse, touchpad, and printer. In one embodiment, the I/O devices and interfaces 403 comprise one or more display devices, such as a monitor, that allows the visual presentation of data to a user. More particularly, a display device provides for the presentation of GUIs, application software data, and multimedia presentations, for example. In the embodiment of FIG. 4, the I/O devices and interfaces 403 also provide a communications interface to various external devices. The computing system 400 may also comprise one or more multimedia devices 402, such as speakers, video cards, graphics accelerators, and microphones, for example.

Computing System Device/Operating System

The computing system 400 may run on a variety of computing devices, such as, for example, a server, a Windows server, an Structure Query Language server, a Unix server, a personal computer, a mainframe computer, a laptop computer, a cell phone, a personal digital assistant, a kiosk, an audio player, and so forth. The computing system 400 is generally controlled and coordinated by operating system software, such as z/OS, DOS, Windows 95, Windows 98, Windows NT, Windows 2000, Windows XP, Windows Vista, Linux, BSD, SunOS, Solaris, or other compatible operating systems. In Macintosh systems, the operating system may be any available operating system, such as MAC OS X. In other embodiments, the computing system 400 may be controlled by a proprietary operating system. Conventional operating systems control and schedule computer processes for execution, perform memory management, provide file system, networking, and I/O services, and provide a user interface, such as a graphical user interface ("GUI"), among other things.

Network

In the embodiment of FIG. 4, the computing system 400 is coupled to a network 410, such as a LAN, WAN, or the Internet, for example, via a wired, wireless, or combination of wired and wireless, communication link 415. The network 410 communicates with various computing devices and/or other electronic devices via wired and/or wireless communication links. In the embodiment of FIG. 4, the network 410 is communicating with one or more computing systems 420 and/or one or more data sources 425.

Access to the scheduler module 406 of the computer system 400 by computing systems 410 and/or by data sources 425 may be through a web-enabled user access point such as the computing systems' 410 or data source's 420 personal computer, cellular phone, laptop, or other device capable of connecting to the network 410. Such a device may have a browser module is implemented as a module that uses text, graphics, audio, video, and other media to present data and to allow interaction with data via the network 410.

The browser module and/or other output module may be implemented as a combination of an all points addressable display such as a cathode-ray tube (CRT), a liquid crystal display (LCD), a plasma display, or other types and/or combinations of displays. In addition, the browser module or other output module may be implemented to communicate with input devices 403 and may also comprise software with the appropriate interfaces which allow a user to access data through the use of stylized screen elements such as, for example, menus, windows, dialog boxes, toolbars, and controls (for example, radio buttons, check boxes, sliding scales, and so forth). Furthermore, the browser module and/or other output module may communicate with a set of input and output devices to receive signals from the user.

The input device(s) may comprise a keyboard, roller ball, pen and stylus, mouse, trackball, voice recognition system, and/or pre-designated switches or buttons. The output device(s) may comprise a speaker, a display screen, a printer, or a voice synthesizer. In addition a touch screen may act as a hybrid input/output device. In another embodiment, a user may interact with the system more directly such as through a system terminal connected to the score generator without communications over the Internet, a WAN, or LAN, or similar network.

In certain embodiments, the system 400 may comprise a physical or logical connection established between a remote microprocessor and a mainframe host computer for the express purpose of uploading, downloading, or viewing interactive data and databases on-line in real time. The remote microprocessor may be operated by an entity operating the computer system 400, including the client server systems or the main server system, and/or may be operated by one or more of the data sources 425 and/or one or more of the computing systems. In certain embodiments, terminal emulation software may be used on the microprocessor for participating in the micro-mainframe link.

In certain embodiments, computing systems 420 who are internal to an entity operating the computer system 400 may access the scheduler module 406 internally as an application or process run by the CPU 404.

User Access Point

In one embodiment, a user access point comprises a personal computer, a laptop computer, a cellular phone, a GPS system, a Blackberry® device, a portable computing device, a server, a computer workstation, a local area network of individual computers, an interactive kiosk, a personal digital assistant, an interactive wireless communications device, a handheld computer, an embedded computing device, or the like.

Other Systems

In addition to the systems that are illustrated in FIG. 4, the network 410 may communicate with other data sources or other computing devices. The computing system 400 may also comprise one or more internal and/or external data sources. In certain embodiments, one or more of the data repositories and the data sources may be implemented using a relational database, such as DB2, Sybase, Oracle, CodeBase and Microsoft® SQL Server, mySQL as well as other types of databases such as, for example, a flat file database, an entity-relationship database, and object-oriented database, and/or a record-based database.

In certain embodiments, the acts, methods, and processes described herein are implemented within, or using, software modules (programs) that are executed by one or more general purpose computers. The software modules may be stored on or within any suitable computer-readable medium. It should be understood that the various steps may alternatively be implemented in-whole or in-part within specially designed hardware. The skilled artisan will recognize that not all calculations, analyses and/or optimization require the use of computers, though any of the above-described methods, calculations or analyses can be facilitated through the use of computers.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Additionally, the skilled artisan will recognize that any of the above-described methods can be carried out using any appropriate apparatus. Further, the disclosure herein of any particular feature in connection with an embodiment can be used in all other disclosed embodiments set forth herein. Thus, it is intended that the scope of the present invention herein disclosed should not be limited by the particular disclosed embodiments described above.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Various inventive methods have been described in this document. Various combinations of these methods (as well as others) may be implemented in a given system, and not all are required to practice the present invention. Further, the methods and system may be implemented differently than described herein without departing from the true spirit and scope of the invention. Thus, nothing in this document is intended to suggest that any particular feature, method, or step is a requirement of the invention.

All of the methods and processes described above may be embodied in, and fully automated via, software code modules executed by one or more general purpose computers. The code modules may be stored in any type of computer-readable medium or other computer storage device. Some or all of the methods may alternatively be embodied in specialized computer hardware.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Additionally, the skilled artisan will recognize that any of the above-described methods can be carried out using any appropriate apparatus. Further, the disclosure herein of any particular feature in connection with an embodiment can be used in all other disclosed embodiments set forth herein. Thus, it is intended that the scope of the present invention herein disclosed should not be limited by the particular disclosed embodiments described above.

What is claimed is:

1. A system for enabling completion of a scheduling opportunity responsive to input, the system using a second computing device receiver that receives an automatically generated at least one presentable option associated with a receipt of the scheduling opportunity from a first computing device, the at least one presentable option received by the second computing device receiver in association with an interactive media transmission, the system comprising:
    at least one microprocessor corollary to the second computing device receiver that extracts a unique identifier specific to an instance of the automatically generated at least one presentable option;
    a memory for storing the unique identifier specific to the instance of the automatically generated at least one presentable option;
    a presentation device that presents a presentation of the at least one presentable option received by the second computing device receiver in association with the interactive media transmission;
    an input device that receives a response associated with the presentation of the at least one presentable option associated with the receipt of the scheduling opportunity;
    wherein the memory further stores a program code that causes the at least one microprocessor to access the memory and to associate as a result, the unique identifier specific to the instance of the automatically generated at least one presentable option associated with the receipt of the scheduling opportunity with the input device response; and
    a transmitter that transmits the result of the association of the unique identifier specific to the instance of the automatically generated at least one presentable option associated with the receipt of the scheduling opportunity with the input device response, to a database server accessible by the first computing device,
    wherein the transmitted result includes the unique identifier specific to the instance of the automatically generated at least one presentable option formatted as a key for accessing the database server to retrieve information necessary to complete the scheduling opportunity.

2. The system of claim 1, wherein the second computing device is a mobile phone.

3. The system of claim 1, wherein the second computing device is an automotive entertainment system.

4. The system of claim 1, wherein the program code operates using an automotive entertainment system.

5. The system of claim 1, wherein in the program code operates using a mobile device system.

6. The system of claim 1, wherein the scheduling opportunity is associated with at least one of the following: a first computing device identifier, a media transmission identifier, scheduling opportunity instructions, an addressable location for access to the interactive media transmission, a reference code for retrieving an addressable location of the scheduling opportunity, a reference code for retrieving an addressable location of the interactive media transmission, a time corresponding to a time of receipt of the interactive media transmission, a time corresponding to a time of receipt of the scheduling opportunity, an amount of time to receive the interactive media transmission, an identification of a type of media received in the interactive media transmission, a file name of the interactive media transmission, an identification of a data protocol structure applied to the transmitted result, an identification of a data protocol structure applied to the scheduling opportunity.

7. The system of claim 1, wherein the interactive media transmission, the scheduling opportunity and the transmitted result are received using at least one of the following multiplexing mechanisms: frequency, wavelength-division, time division, code division, space division, polarization division.

8. The system of claim 1, wherein the second computing device comprises at least one of the following: a personal computer, a mobile phone, a tablet, a laptop computer, an automotive head unit.

9. A method for enabling completion of a scheduling opportunity responsive to input, the method using a second computing device receiver receiving an automatically generated at least one presentable option associated with a receipt of the scheduling opportunity from a first computing device, the at least one presentable option received by the second computing device receiver in association with an interactive media transmission, the method comprising:
 extracting a unique identifier specific to an instance of the automatically generated at least one presentable option using at least one microprocessor corollary to the second computing device receiver;
 storing the unique identifier specific to the instance of the automatically generated at least one presentable option using a memory;
 presenting a presentation of the at least one presentable option received by the second computing device receiver in association with the interactive media transmission using a presentation device;
 receiving a response associated with the presentation of the at least one presentable option associated with the receipt of the scheduling opportunity using an input device;
 causing, by a program code stored in the memory, the at least one microprocessor to associate as a result, the unique identifier specific to the instance of the automatically generated at least one presentable option associated with the receipt of the scheduling opportunity with the received response; and
 transmitting using a transmitter, the result of the association of the unique identifier specific to the instance of the automatically generated at least one presentable option associated with the receipt of the scheduling opportunity with the received response, to a database server accessible by the first computing device,
 wherein the transmitted result includes the unique identifier specific to the instance of the automatically generated at least one presentable option formatted as a key for accessing the database server to retrieve information necessary to complete the scheduling opportunity.

10. The method of claim 9, wherein the second computing device is a mobile phone.

11. The method of claim 9, wherein the second computing device is an automotive entertainment system.

12. The method of claim 9, wherein the program code operates using an automotive entertainment system.

13. The method of claim 9, wherein in the program code operates using a mobile device system.

14. The method of claim 9, wherein the scheduling opportunity is associated with at least one of the following: a first computing device identifier, a media transmission identifier, scheduling opportunity instructions, an addressable location for access to the interactive media transmission, a reference code for retrieving an addressable location of the scheduling opportunity, a reference code for retrieving an addressable location of the interactive media transmission, a time corresponding to a time of receipt of the interactive media transmission, a time corresponding to a time of receipt of the scheduling opportunity, an amount of time to receive the interactive media transmission, an identification of a type of media received in the interactive media transmission, a file name of the interactive media transmission, an identification of a data protocol structure applied to the transmitted result, an identification of a data protocol structure applied to the scheduling opportunity.

15. The method of claim 9, wherein the interactive media transmission, the scheduling opportunity and the transmitted result are received using at least one of the following multiplexing mechanisms: frequency, wavelength-division, time division, code division, space division, polarization division.

16. The method of claim 9, wherein the second computing device comprises at least one of the following: a personal computer, a mobile phone, a tablet, a laptop computer, an automotive head unit.

* * * * *